United States Patent
Yokota et al.

(10) Patent No.: US 7,218,663 B1
(45) Date of Patent: May 15, 2007

(54) COMMUNICATION SYSTEM IN WHICH ARBITRARY NUMBER OF COMMUNICATION APPARATUSES FORM GROUP TO COMMUNICATE WITH EACH OTHER, AND THE COMMUNICATION APPARATUS

(75) Inventors: Akane Yokota, Yokohama (JP); Hidetada Nago, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 527 days.

(21) Appl. No.: 09/219,747

(22) Filed: Dec. 23, 1998

(30) Foreign Application Priority Data

Dec. 26, 1997 (JP) ............................................. 9-369209
Dec. 26, 1997 (JP) ............................................. 9-369210

(51) Int. Cl.
*H04B 1/38* (2006.01)

(52) U.S. Cl. ........................................ 375/130; 455/519
(58) Field of Classification Search ................. 375/132, 375/133, 134, 135, 136, 137, 219, 220; 455/403, 455/416, 455, 434, 463, 422, 500, 507, 509, 455/502, 511, 515, 516, 518, 519; 370/329, 370/330, 331, 327, 341, 349, 350, 431, 432
See application file for complete search history.

(56) References Cited

U.S. PATENT DOCUMENTS

| | | | | |
|---|---|---|---|---|
| 4,532,636 A | * | 7/1985 | Wilkinson et al. ........... | 375/136 |
| 4,554,668 A | * | 11/1985 | Deman et al. ............... | 375/133 |
| 4,850,036 A | * | 7/1989 | Smith .......................... | 375/134 |
| 5,394,433 A | * | 2/1995 | Bantz et al. ................. | 375/132 |
| 5,551,062 A | * | 8/1996 | Drozt et al. ................. | 455/512 |
| 5,600,635 A | | 2/1997 | Hamaki et al. ............. | 370/280 |
| 5,691,979 A | * | 11/1997 | Cadd et al. .................. | 370/312 |
| 5,742,745 A | * | 4/1998 | Sugikawa et al. .......... | 358/1.15 |
| 5,771,352 A | | 6/1998 | Nakamura et al. ..... | 395/200.57 |
| 5,835,860 A | * | 11/1998 | Diachina ..................... | 455/458 |
| 5,870,391 A | | 2/1999 | Nago .......................... | 370/330 |
| 5,907,545 A | | 5/1999 | Arai et al. ................... | 370/342 |
| 5,987,032 A | * | 11/1999 | Nadgauda et al. .......... | 370/437 |
| 6,014,406 A | | 1/2000 | Shida et al. ................. | 375/202 |
| 6,118,771 A | * | 9/2000 | Tajika et al. ................ | 370/328 |
| 6,373,829 B1 | * | 4/2002 | Vilmur ....................... | 370/335 |

FOREIGN PATENT DOCUMENTS

| | | |
|---|---|---|
| JP | 60-246151 | 12/1985 |
| JP | 61-099439 | 5/1986 |
| JP | 1-261039 | 10/1989 |
| JP | 1-300735 | 12/1989 |
| JP | 6-125544 | 5/1990 |
| JP | 7-297824 | 11/1995 |
| JP | 7-321736 | 12/1995 |
| JP | 08-111891 | 4/1996 |
| JP | 8-298687 | 11/1996 |
| JP | 9-200087 | 7/1997 |
| JP | 9-284421 | 10/1997 |
| JP | 9-294293 | 11/1997 |
| JP | 8-125656 | 5/1998 |

\* cited by examiner

*Primary Examiner*—Khanh Tran
(74) *Attorney, Agent, or Firm*—Fitzpatrick, Cella, Harper & Scinto

(57) ABSTRACT

In a communication system having a plurality of communication apparatuses, an arbitrary number of communication apparatuses form a group, and group identification information for group communication is assigned to the group. Communication is performed in this group by using the assigned group identification information.

14 Claims, 29 Drawing Sheets

FIG.16

| | T1 | T2 | T3 | T4 | T5 | T6 | T7 | T8 | T1 | T2 | T3 | T4 |
|---|---|---|---|---|---|---|---|---|---|---|---|---|
| FREQUENCY 1 | A | | | | | | ▨ | | A | | | |
| FREQUENCY 2 | | B | | | | | | ▨ | | B | | |
| FREQUENCY 3 | ▨ | | C | | | | | | ▨ | | C | |
| FREQUENCY 4 | | ▨ | | D | | | | | | ▨ | | D |
| FREQUENCY 5 | | | ▨ | | A | | | | | | ▨ | |
| FREQUENCY 6 | | | | ▨ | | B | | | | | | ▨ |
| FREQUENCY 7 | | | | | ▨ | | C | | | | | |
| FREQUENCY 8 | | | | | | ▨ | | D | | | | |

ONE HOPPING PERIOD (T1–T8)

FIG.17A

CHANNELS FORMING FRAME

| CNT | GT | LCCH | GT | Data | GT |
|---|---|---|---|---|---|

FIG.17B

CNT CHANNEL

| CS | R | PR | SYN | ID | DM | WA | BF | NF | CRC | TOTAL |
|---|---|---|---|---|---|---|---|---|---|---|
| 8 | 8 | 56 | 16 | 16 | 2 | 8 | 8 | 8 | 16 | 146 |

FIG.17C

BASIC CHANNEL FORMAT

| CS | R | CS | R | CS | R | CS | R | PR | UW | DM | ID | Data Body | CRC |
|---|---|---|---|---|---|---|---|---|---|---|---|---|---|

FIG.17D

CHANNEL LENGTH

|  | CS | R | CS | R | CS | R | CS | R | PR | UW | DM | ID | Data Body | CRC | TOTAL |
|---|---|---|---|---|---|---|---|---|---|---|---|---|---|---|---|
| LCCH CHANNEL | 16 | 8 | 16 | 8 | 16 | 8 | 16 | 8 | 56 | 24 | 2 | 8 | 194 | 16 | 394 |
| Data CHANNEL | 16 | 8 | 16 | 8 | 16 | 8 | 16 | 8 | 56 | 24 | 2 | 8 | 5325 | 16 | 5325 |
| GT CHANNEL |  |  |  |  |  |  |  |  |  |  |  |  | 125 |  | 125 |
| - |  |  |  |  |  |  |  |  |  |  |  |  |  |  |  |

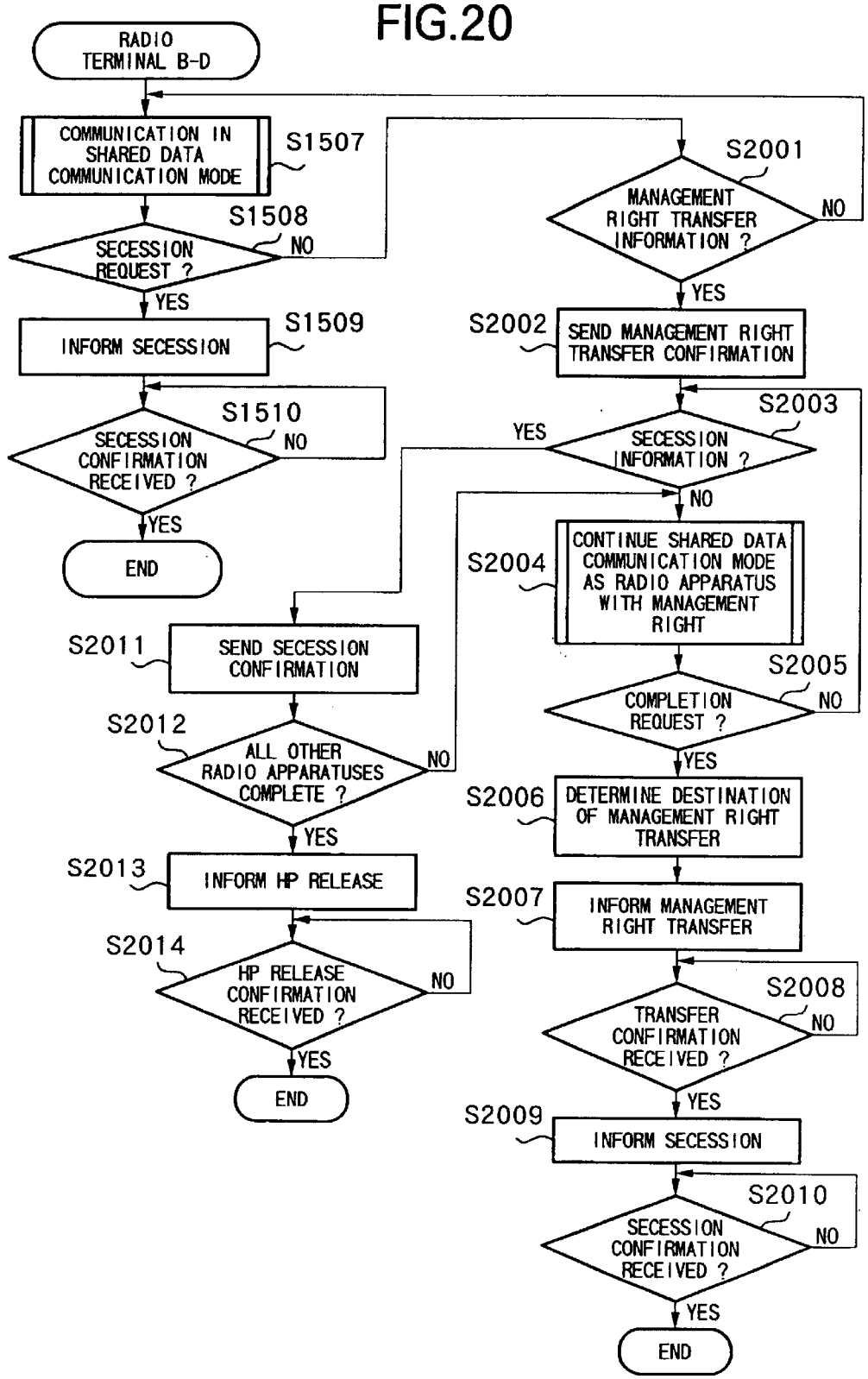

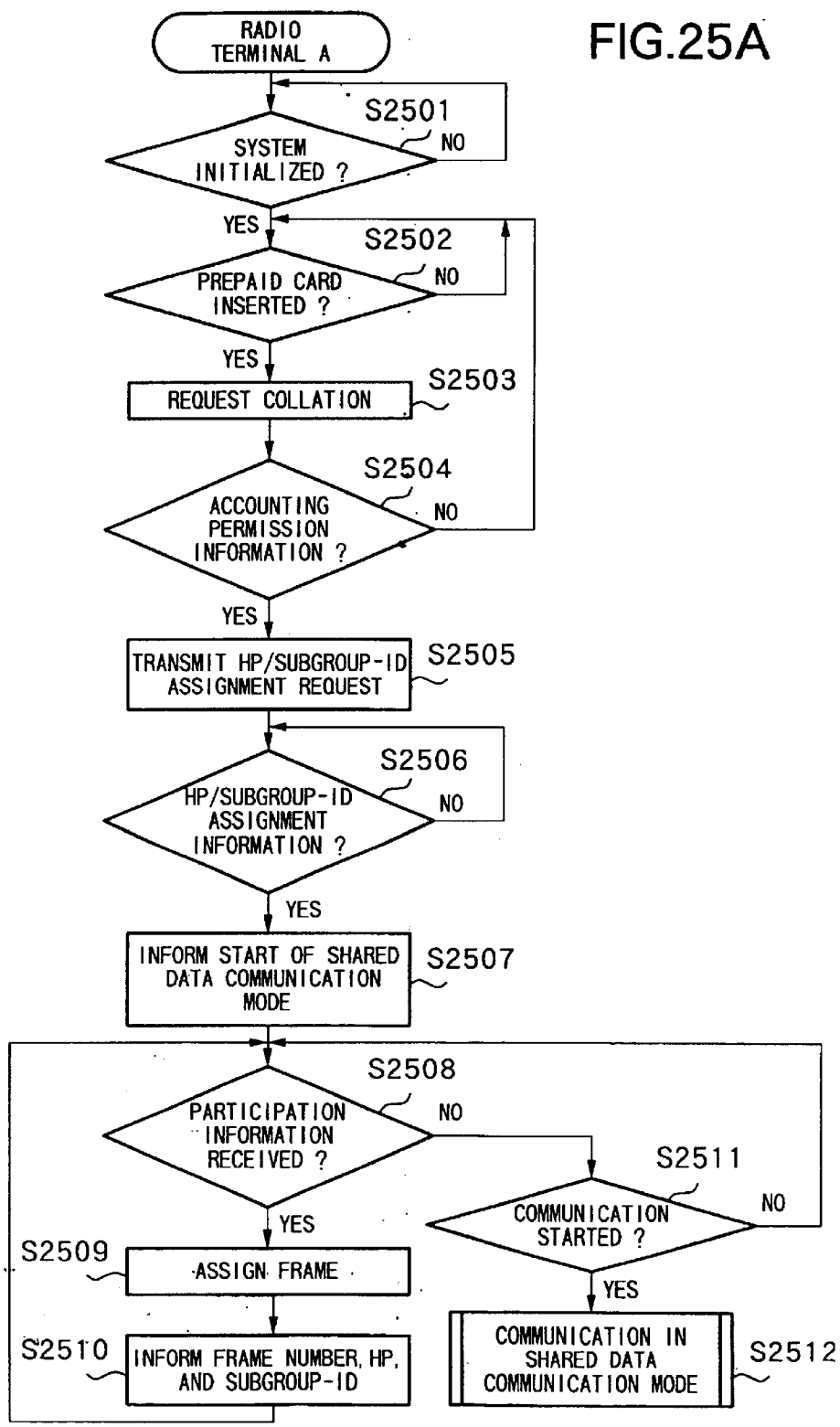

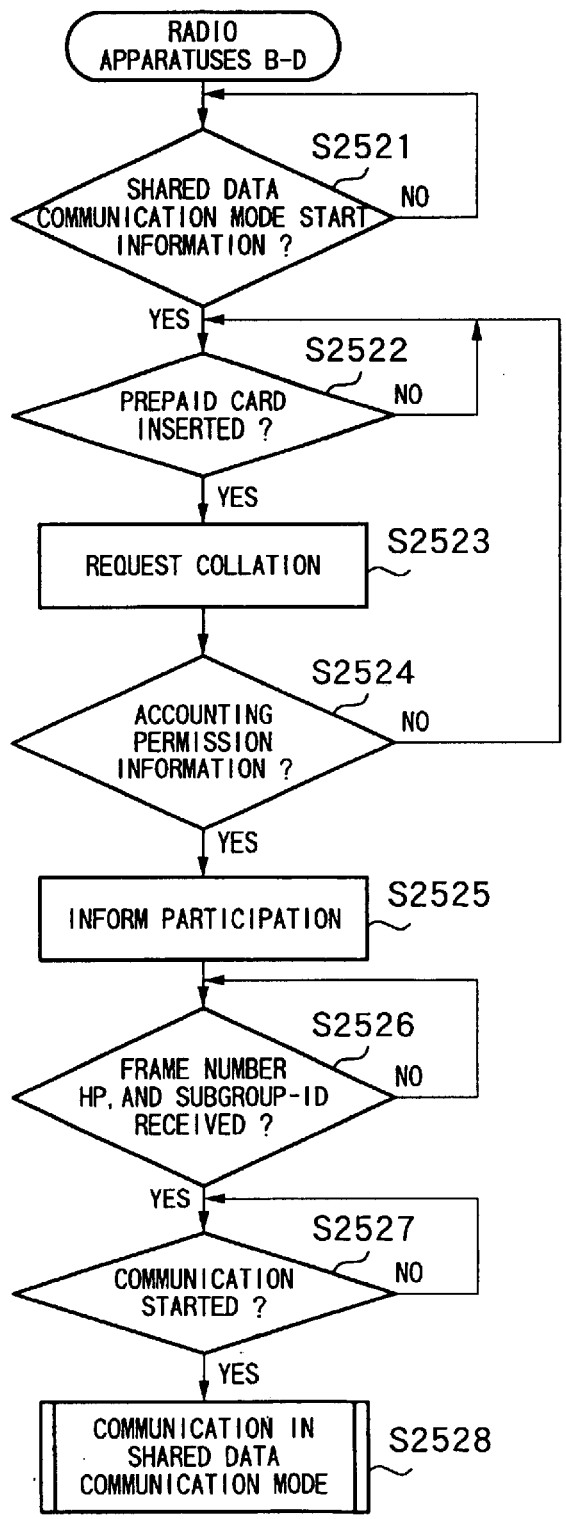

FIG.26A

CHANNELS FORMING FRAME

| THE SAME FREQUENCY AS CNT | | | | | COMMUNICATION BY HP ASSIGNMENT | | |
|---|---|---|---|---|---|---|---|
| CNT | GT | LCCH | GT | Data1 | GT | Data2 | GT |

FIG.26B

CNT CHANNEL

| CS | R | PR | SYN | ID | DM | WA | BF | NF | CRC | TOTAL |
|---|---|---|---|---|---|---|---|---|---|---|
| 8 | 8 | 56 | 16 | 16 | 2 | 8 | 8 | 8 | 16 | 146 |

FIG.26C

BASIC CHANNEL FORMAT

| CS | R | CS | R | CS | R | CS | R | PR | UW | DM | ID | Data Body | CRC |
|---|---|---|---|---|---|---|---|---|---|---|---|---|---|

FIG.26D

CHANNLEL LENGTH

| | CS | R | CS | R | CS | R | CS | R | PR | UW | DM | ID | Data Body | CRC | TOTAL |
|---|---|---|---|---|---|---|---|---|---|---|---|---|---|---|---|
| LCCH CHANNEL | 16 | 8 | 16 | 8 | 16 | 8 | 16 | 8 | 56 | 24 | 2 | 8 | 194 | 16 | 394 |
| Data1 CHANNEL | 16 | 8 | 16 | 8 | 16 | 8 | 16 | 8 | 56 | 24 | 2 | 8 | 2403 | 16 | 2605 |
| Data2 CHANNEL | 16 | 8 | 16 | 8 | 16 | 8 | 16 | 8 | 56 | 24 | 2 | 8 | 2403 | 16 | 2605 |
| GT CHANNEL | | | | | | | | | | | | | 125 | | 125 |

COMMUNICATION SYSTEM IN WHICH ARBITRARY NUMBER OF COMMUNICATION APPARATUSES FORM GROUP TO COMMUNICATE WITH EACH OTHER, AND THE COMMUNICATION APPARATUS

BACKGROUND OF THE INVENTION

1. Field of the Invention

The present invention relates to a communication system in which an arbitrary number of communication apparatuses form a group to communicate with each other, and the communication apparatus.

2. Description of the Related Art

In a conventional network conference system, for example, terminals constituting the conference transmit and receive data shared by these terminals in real time. That is, each terminal sends information to the server. The server forms new data on the basis of the information from each terminal and transmits the data to each terminal.

In this conventional technique, however, if the number of terminals increases and these terminals transmit and receive shared data more frequently, the load on the server increases. Consequently, a high-speed apparatus is required as the server, and this increases the system cost.

Recently, a spread spectrum communication method has attracted attention as one digital radio communication method. In particular, a frequency hopping spread spectrum communication method is beginning to be used often because the system configuration can be realized relatively easily.

For example, a radio communication system is provided which includes radio apparatuses serving as subsidiary apparatuses and a radio apparatus serving as a master apparatus for managing these subsidiary apparatuses, and performs radio transmission between these apparatuses by using the frequency hopping spread spectrum communication method.

In one system of this sort, each radio apparatus is given a unique identification number (to be referred to as an ID hereinafter), and the communication system is given a unique identification number (to be referred to as a group-ID hereinafter). Radio apparatuses communicate with each other by using their IDs, and multi-address calling is performed by using the group-ID.

Furthermore, some radio apparatuses in a radio communication system sometimes form small groups (subgroups) to communicate with each other. If this is the case, each subgroup is given a subgroup identification number (to be referred to as a subgroup-ID hereafter). Radio apparatuses having the same subgroup-ID can perform multi-address calling (to be referred to as subgroup communication hereinafter) in the subgroup.

In this conventional system, however, the subgroup-IDs of radio apparatuses are preset, so any arbitrary number of radio apparatuses cannot form a new subgroup.

SUMMARY OF THE INVENTION

It is an object of the present invention to provide a radio communication system in which a plurality of terminals can transmit and receive shared data in real time.

It is another object of the present invention to dynamically give a subgroup-ID to an arbitrary number of radio apparatuses constituting a radio communication system.

It is still another object of the present invention to provide a radio communication system capable of forming a new subgroup by using a subgroup-ID and performing multi-address data communication in this subgroup.

It is still another object of the present invention to improve the efficiency of communication performed in a subgroup.

According to one aspect of the present invention is provided a radio communication apparatus that comprises means for requesting, from a first communication apparatus, an assignment of group identification information to manage a group formed from a part of communication apparatuses in a communication system, and means for inquiring of a second communication apparatus whether the latter apparatus participates in group communication using the group identification information assigned by the first communication apparatus in response to the request by the requesting means. Also provided are communicating means for performing the group communication in the group with the second communication apparatus on the basis of the group identification information, in accordance with a response from the second communication apparatus in response to the inquiry by the inquiring means.

Another aspect of the invention is a method of performing radio communication, by a radio communication apparatus, comprising requesting from a first communication apparatus, group identification information to manage a group formed from a part of the communication apparatuses in a communication system. Inquiry is made of a second communication apparatus as to whether the latter apparatus participates in group communication using the group identification information assigned by the first communication apparatus in response to the request in the requesting step. Group communication in the group with the second communication apparatus is performed on the basis of the group identification information, in accordance with response from the second communication apparatus to the inquiry in the inquiring step.

Another aspect of the invention is a program product that executes such method.

According to another aspect of the present invention is provided a radio communication apparatus that comprises a requesting unit, adapted to request, from a first communication apparatus, an assignment of group identification information to manage a group formed from a part of communication apparatuses in a communication system. The apparatus also comprises an inquiring unit, adapted to inquire of a second communication apparatus whether the second communication apparatus participates in group communication using the group identification information assigned by the first communication apparatus in response to the request by the requesting unit, and an informing unit, adapted to inform the second communication apparatus of the group identification information, in accordance with a response from the second communication apparatus.

Another aspect of the invention is a method of performing radio communication by a radio communication apparatus, comprising requesting, from a first communication apparatus, an assignment of group identification information to manage a group formed from a part of communication apparatuses in a communication system. An inquiry is made of a second communication apparatus as to whether the latter apparatus participates in group communication using the group identification information assigned by the first communication apparatus in response to the request in the requesting step, and the second communication apparatus is informed of the group indentification information, in accordance with a response from the second communication apparatus to the inquiry.

Another aspect of the invention is a program product for executing such method.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 16 is a view for explaining the transition of frequency hopping in the second embodiment;

FIGS. 17A to 17D are views for explaining the formats of a radio frame in the second embodiment;

FIG. 20 is a flow chart showing the operation of the subsidiary apparatus in the third embodiment;

FIGS. 25A and 25B are sequence charts showing the operation of a subsidiary apparatus in the fifth embodiment;

FIGS. 26A to 26D are views showing the formats of a radio frame in the fifth embodiment.

DETAILED DESCRIPTION OF THE PREFERRED EMBODIMENTS

First Embodiment

Figure 1:
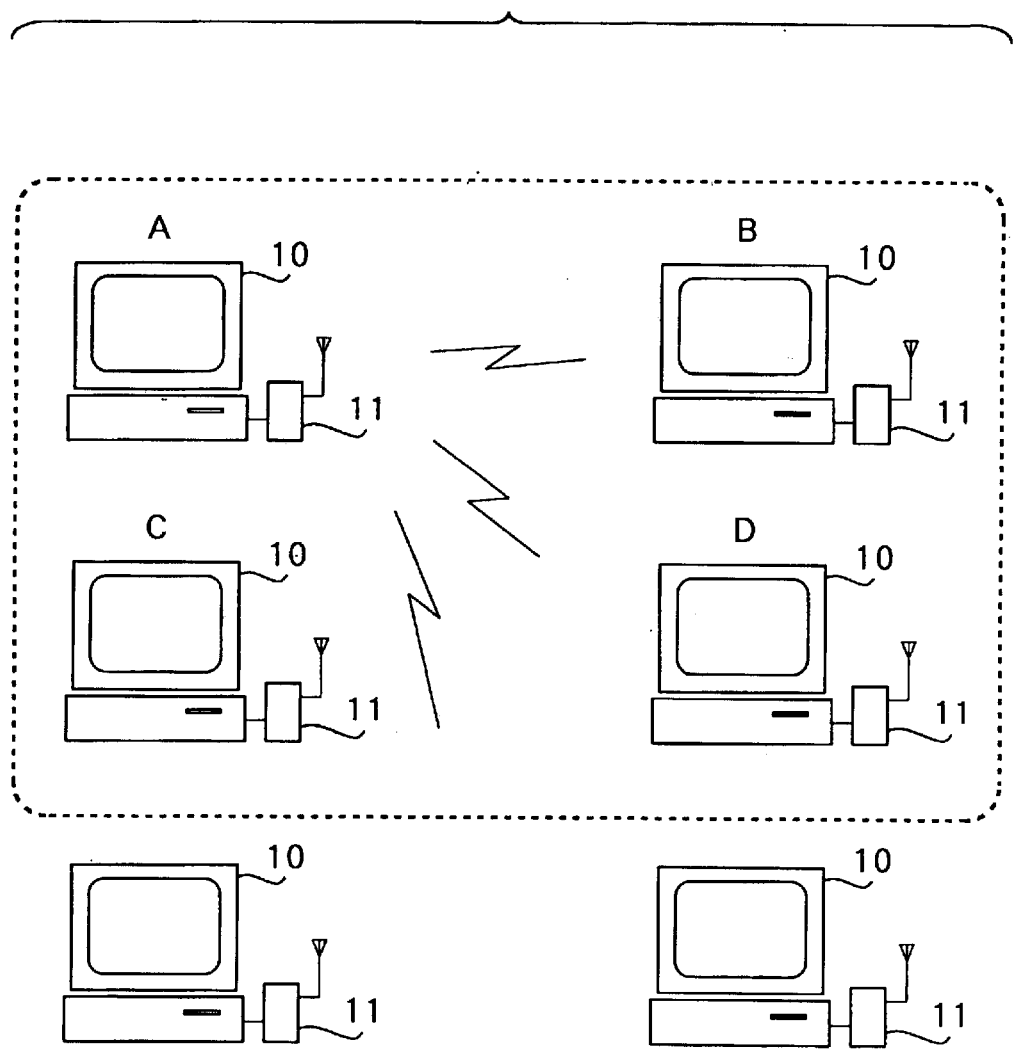
FIG. 1 is a view showing an outline of the system configuration in the first embodiment of the present invention.

FIG. 1 is a view for explaining an outline of a radio communication system in the first embodiment of the present invention. Referring to FIG. 1, an information apparatus 10 such as a computer is connected to a radio apparatus 11 for performing frequency hopping spread spectrum radio communication. A plurality of communication terminal units each including the information apparatus 10 and the radio communication apparatus 11 perform radio communication.

One of the radio apparatuses of these communication terminal units functions as a master apparatus, and the remaining radio apparatuses function as subsidiary apparatuses. In the following explanation, assume that four radio apparatuses A to D existing in a portion surrounded by the broken lines in FIG. 1 constitute a radio communication system, the radio apparatus A is a master apparatus, and an arbitrary number of radio apparatuses constituting the radio communication system form a subgroup to perform subgroup communication.

Note also that the group-ID of this radio communication system is 10, and the IDs of the radio apparatuses A, B, C, and D are 01, 02, 03, and 04, respectively. Examples of applications using subgroup communication are bulletin board electronic conference systems and competing games in a game center.

Figure 2:
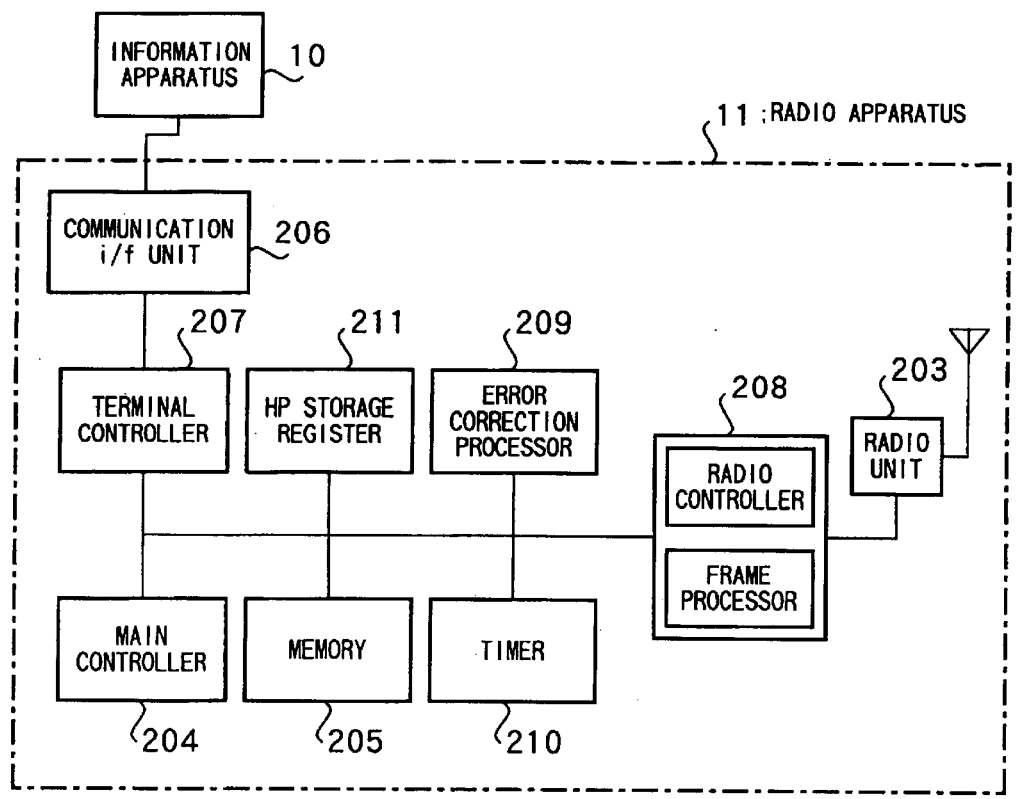
FIG. 2 is a block diagram showing the arrangement of a radio apparatus in the first embodiment.

FIG. 2 is a block diagram showing the internal arrangement of the radio apparatus 11.

Referring to FIG. 2, the information apparatus 10 is connected to the radio apparatus 11 via a communication interface (i/f) unit 206. This communication i/f unit 206 connects a communication i/f, e.g., an RS232C or centronics i/f, as standard equipment of the information apparatus 10 to an internal bus, e.g., an ISA bus or PCMCIA i/f, of a personal computer or workstation.

A radio unit 203 of the radio apparatus 11 performs frequency hopping radio communication with radio units of other radio apparatuses 11.

A main controller 204 includes a CPU, a peripheral device for performing interrupt control and DMA control, a system clock oscillator, and the like, and controls each block in this radio apparatus.

A memory 205 includes a ROM storing programs to be used by the main controller 204 and a RAM to be used as a buffer area for various processes.

The operation of this embodiment to be described later is executed by the main controller 204 on the basis of the programs stored in the memory 205. In the present invention, it is also possible to store these programs in an external storage medium such as a floppy disk, hard disk, magnetooptical disk, or CD-ROM, load the programs in the memory 205 by using a dedicated reader, and execute the programs by the main controller 204. Alternatively, the programs can be transferred from the information apparatus 10, stored in the memory 205, and executed by the main controller 204.

A terminal controller 207 performs various control processes necessary when the information apparatus 10 and the radio apparatus 11 perform data communication via the communication i/f 206.

A channel codec 208 performs frame processing and radio communication. This channel codec 208 assembles data into the form of a frame and transmits the frame to other radio apparatuses via the radio unit 203. The radio frame is composed of a frame synchronous channel, logic control channel, data channel, and the like. Details of this radio frame will be described later.

An error correction processor 209 reduces bit errors produced in data by radio communication. This error correction processor 209 inserts an error correction code into communication data when the data is transmitted. When data is received, the error correction processor 209 calculates error positions and patterns by arithmetic processing and corrects bit errors in the received data.

A timer 210 provides a timing signal used by each block in the radio apparatus 11. A hopping pattern (HP) storage register 211 stores a moving frequency (hopping pattern).

Figure 3:
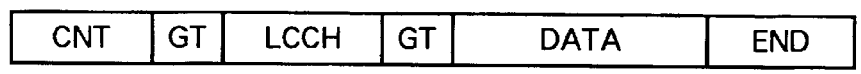
FIG. 3 is a view showing the format of a radio frame used in radio communication in the first embodiment.

FIG. 3 is a view for explaining the internal channel format of a radio frame used in this embodiment.

In FIG. 3, reference symbol CNT denotes a system control channel (to be referred to as a CNT channel hereinafter); LCCH, a logic control channel (to be referred to as an LCCH channel hereinafter); DATA, a data channel for exchanging data in two ways; GT, a guard channel used until the frequency is completely changed to perform frequency hopping in the next channel; and END, a guard channel used until the frequency is completely changed to perform frequency hopping in the next frame.

A master apparatus transmits the CNT channel whenever a frame is started. Radio apparatuses other than the master apparatus receive the CNT channel and establish bit synchronization and frame synchronization. The LCCH channel is used to connect or disconnect the channel.

Figure 4:
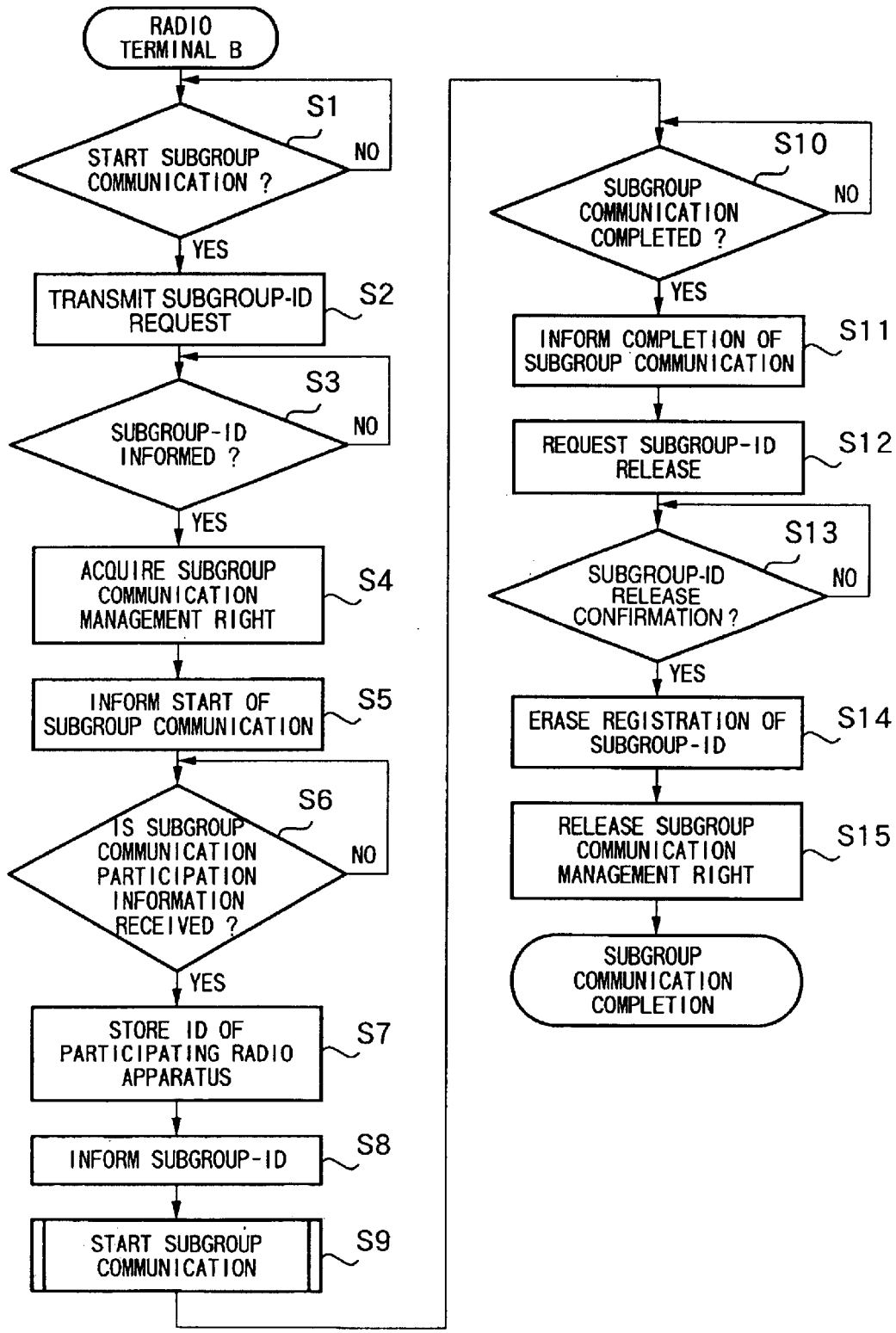
FIG. 4 is a flow chart showing the operation of a radio apparatus having the right to manage subgroup communication in the first embodiment.
Figure 5:
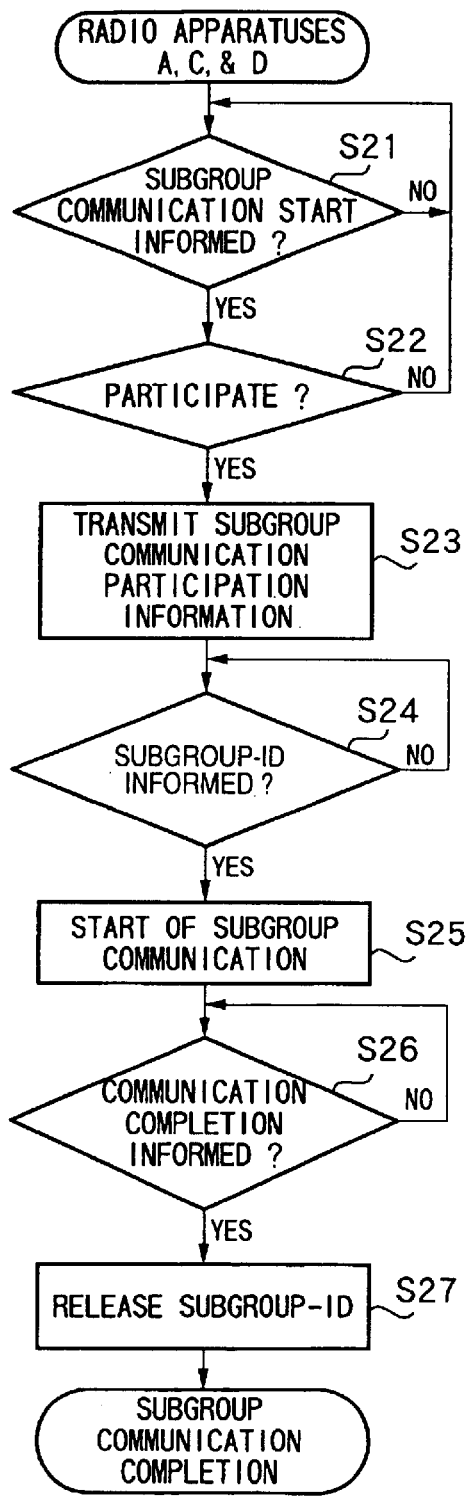
FIG. 5 is a flow chart showing the operation of a radio apparatus having no right to manage subgroup communication in the first embodiment.
Figure 6:
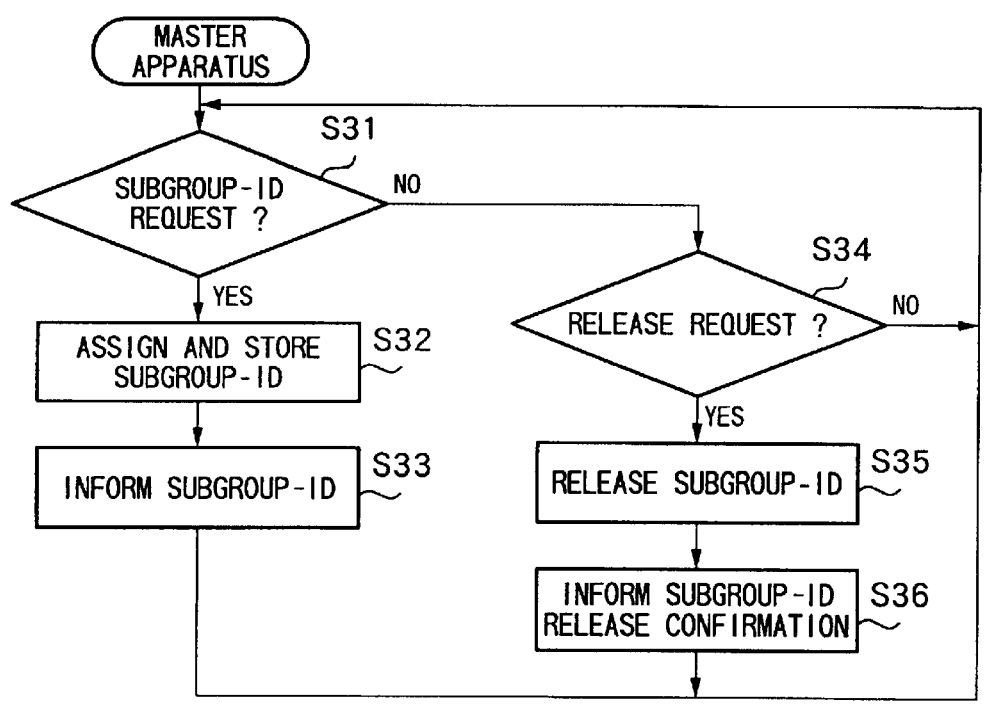
FIG. 6 is a flow chart showing the operation of a master apparatus in the first embodiment.

FIGS. 4 to 6 are flow charts showing the operations of individual radio apparatuses in this embodiment. FIG. 4 shows the operation of a radio apparatus having the right to manage subgroup communication. FIG. 5 shows the operation of other radio apparatuses. FIG. 6 shows the operation of a master apparatus.

Figure 7:
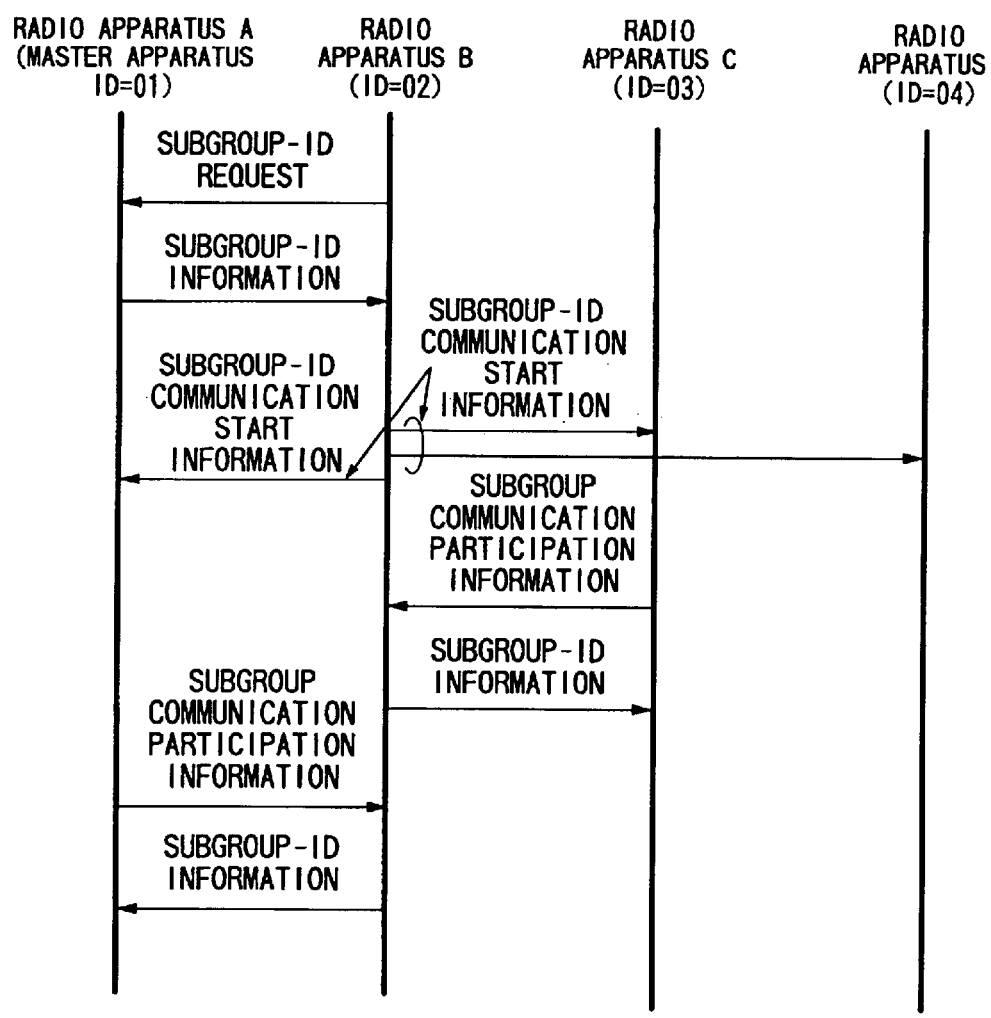
FIG. 7 is a sequence chart showing the procedure when subgroup communication is started in the first embodiment.
Figure 8:
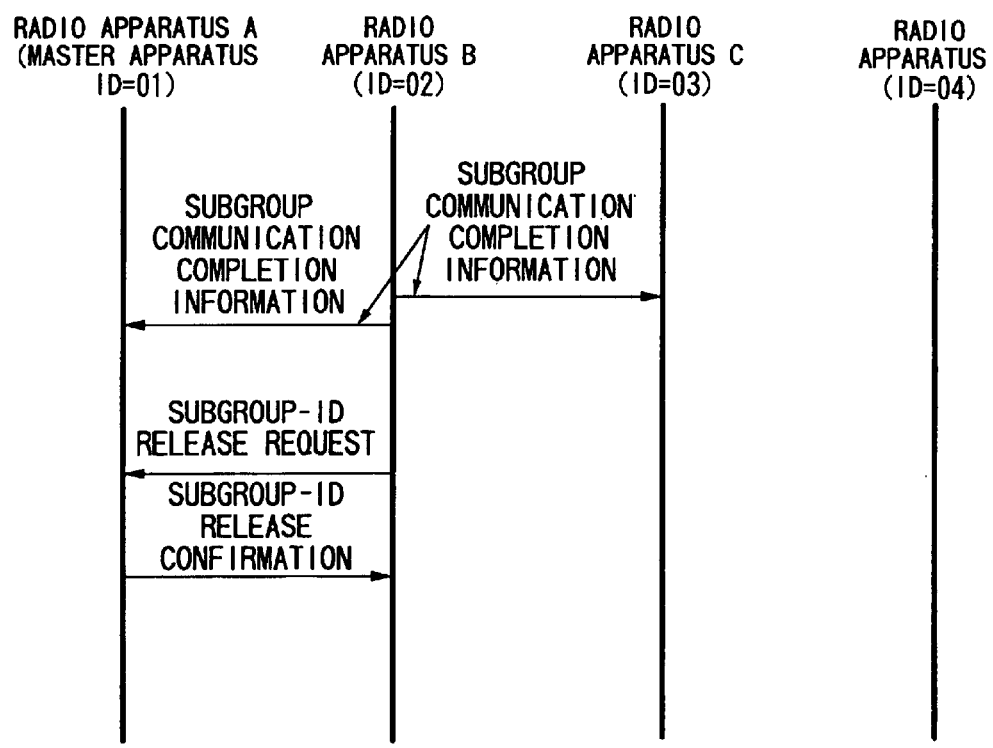
FIG. 8 is a sequence chart showing the procedure when the subgroup communication is complete in the first embodiment.

FIG. 7 is a sequence chart showing the procedure when subgroup communication is started in this embodiment. FIG. 8 is a sequence chart showing the procedure when the subgroup communication is complete in this embodiment.

When one radio apparatus in this radio communication system starts subgroup communication, this radio apparatus transmits a subgroup-ID request to the master apparatus through the LCCH channel. In this embodiment, the radio apparatus B transmits the subgroup-ID request to the radio apparatus A as the master apparatus (S1 and S2).

Upon receiving this request (S31), the master apparatus (radio apparatus A) checks a stored group-ID, the IDs of radio apparatuses belonging to the radio communication system, and already assigned subgroup-IDs. The master apparatus selects a number different from any of these IDs, assigns the selected number as a subgroup-ID, and stores this subgroup-ID (S32). The master apparatus also informs the radio apparatus, which has transmitted the start request, of this newly assigned subgroup-ID through the LCCH channel (S33).

In this embodiment, 01, 02, 03, and 04 are used as the IDs of radio apparatuses constituting the radio communication system, and 10 is used as the group-ID. Therefore, the master apparatus assigns, e.g., 05 as the subgroup-ID and informs the radio apparatus B of this subgroup-ID through the LCCH channel.

The radio apparatus B which has received this information (S3) acquires the management right in subgroup communication (S4). Referring to FIG. 7, the radio apparatus B acquires the management right in subgroup communication.

The radio apparatus which has received the subgroup-ID and acquired the management right in subgroup communication informs other radio apparatuses of the start of subgroup communication by multi-address calling using the group-ID through the LCCH channel (S5).

Each radio apparatus receives this subgroup communication start information (S21) and displays the information on the display unit of the information apparatus to check whether the operator wants to participate in the communication (S22). If the operator's response indicates that the operator wants to participate in the subgroup communication, this radio apparatus transmits through the LCCH channel subgroup communication participation information to the radio apparatus which has transmitted the subgroup start information (S23).

Referring to FIG. 7, the radio apparatus B informs the other radio apparatuses of the start of subgroup communication by using the group-ID. Of radio apparatuses which have received this subgroup communication start information, the radio apparatuses A and C which will participate in the subgroup communication transmit the subgroup communication participation information to the radio apparatus B through the LCCH channel.

The radio apparatus receives this subgroup communication participation information (S6), stores the ID of each radio apparatus which has transmitted the information (S7), and informs each radio apparatus, which has transmitted the subgroup communication participation information, of the subgroup-ID through the LCCH channel (S8). After that, this subgroup communication is started (S9).

Each radio apparatus receives this subgroup-ID information (S24), stores the subgroup-ID, and starts the subgroup communication (S25).

Referring to FIG. 7, the radio apparatuses A and C transmit the subgroup communication participation information. The radio apparatus B informs the radio apparatuses A and C of the subgroup-ID through the LCCH channel.

After that, the three radio apparatuses A, B, and C start the subgroup communication by using the subgroup-ID.

When the subgroup communication is complete (S10), the radio apparatus having the subgroup communication management right informs the radio apparatuses in the subgroup of the completion of the subgroup communication through the LCCH channel (S11), and transmits a subgroup-ID release request to the master apparatus through the LCCH channel (S12).

Each radio apparatus in the subgroup receives the subgroup communication completion information and releases the stored subgroup-ID to complete the subgroup communication (S26 and S27).

The master apparatus receives the subgroup-ID release request (S34), releases the subgroup-ID, and transmits subgroup-ID release confirmation through the LCCH channel (S35 and S36).

The radio apparatus having the subgroup communication management right receives this subgroup-ID release confirmation (S13) and cancels the registration of the subgroup-ID to release the subgroup communication management right (S14 and S15), thereby completing the subgroup communication.

In the above embodiment, multi-address calling using the group-ID or subgroup-ID is performed once for each ID. However, radio apparatuses unable to receive this calling may exist. Therefore, the same multi-address calling can also be performed a plurality of number of times in accordance with the type of application used.

Additionally, in the above embodiment, each of the group-ID, subgroup-ID, and ID is represented by using a number of two digits. However, a number of another number of digits or a symbol can also be used.

In this embodiment as described above, a subgroup can be dynamically formed and released by giving a subgroup identification number to any arbitrary number of radio apparatuses among other radio apparatuses constituting a radio communication system. Accordingly, it is possible to realize a network conference system or a competing game in a game center by using a subgroup formed by an arbitrary number of radio apparatuses.

Second Embodiment

Figure 9:
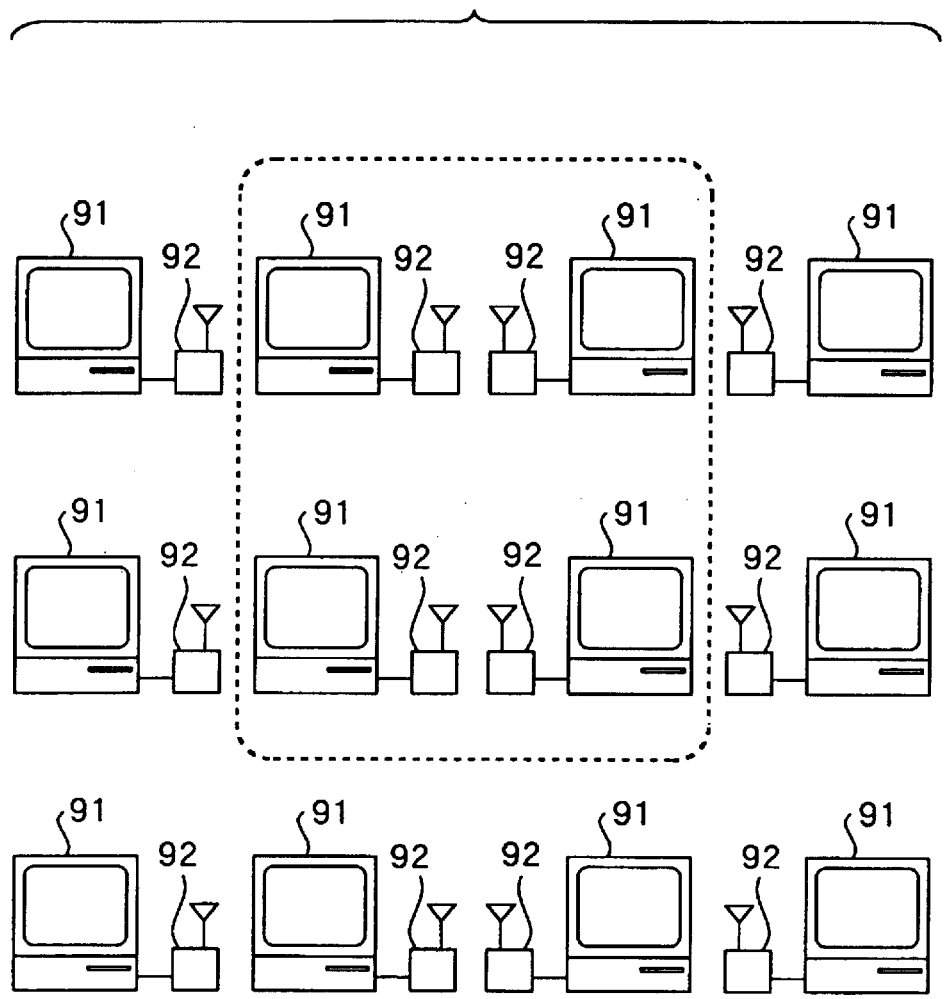
FIG. 9 is a view for explaining the system configuration in the second to fourth embodiments of the present invention.

FIG. 9 is a view for explaining an outline of the system in the second embodiment of the present invention.

As shown in FIG. 9, the system of this embodiment has a plurality of information processing terminals 91. Each information processing terminal 91 is a personal computer or the like and has a radio apparatus 92 for performing frequency hopping radio communication.

The broken lines in FIG. 9 indicate the range within which a subgroup is formed in the system and data is shared by an application (e.g., a network conference system). That is, in this embodiment, four information processing terminals share data of a certain application.

Figure 10:
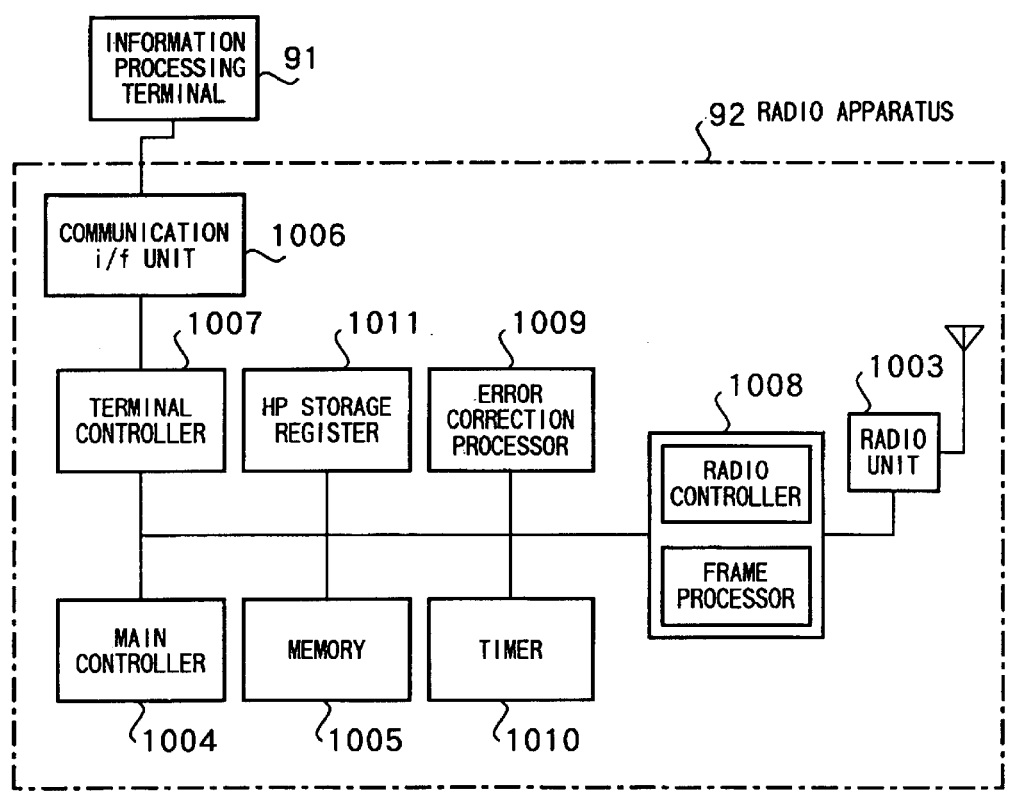
FIG. 10 is a block diagram showing the arrangement of a radio apparatus in the second to sixth embodiments of the present invention.

FIG. 10 is a block diagram showing the internal arrangement of the radio apparatus 92.

Referring to FIG. 10, the information processing terminal 91 is connected to the radio apparatus 92 via a communication interface (i/f) unit 1006. This communication i/f unit 1006 connects a communication i/f, e.g., an RS232C or centronics i/f, as standard equipment of the information processing terminal 10 to an internal bus, e.g., an ISA bus or PCMCIA i/f, of a personal computer or workstation.

A radio unit 1003 of the radio apparatus 92 performs frequency hopping radio communication with radio units of other radio apparatuses 92.

A main controller 1004 includes a CPU, a peripheral device for performing interrupt control and DMA control, a system clock oscillator, and the like, and controls each block in this radio apparatus.

A memory 1005 includes a ROM storing programs to be used by the main controller 1004 and a RAM to be used as a buffer area for various processes.

The operation of this embodiment to be described later is executed by the main controller 1004 on the basis of the programs stored in the memory 1005. In the present invention, it is also possible to store these programs in an external storage medium such as a floppy disk, hard disk, magnetooptical disk, or CD-ROM, read out the programs into the memory 1005 by using a dedicated reader, and execute the programs by the main controller 1004. Alternatively, the programs can be transferred from the information processing terminal 91, stored in the memory 1005, and executed by the main controller 1004.

A terminal controller 1007 performs various control processes necessary when the information processing terminal 91 and the radio apparatus 92 perform data communication via the communication i/f 1006.

A channel codec 1008 performs frame processing and radio communication. This channel codec 1008 assembles data into the form of a frame and transmits the frame to other radio apparatuses via the radio unit 1003. The radio frame is composed of a frame synchronous channel, logic control channel, data channel, and the like. Details of this radio frame will be described later.

An error correction processor 1009 reduces bit errors produced in data by radio communication. This error correction processor 1009 inserts an error correction code into communication data when the data is transmitted. When data is received, the error correction processor 1009 calculates error positions and patterns by arithmetic processing and corrects bit errors in the received data.

A timer 1010 provides a timing signal used by each block in the radio apparatus 92. A hopping pattern (HP) storage register 1011 stores a moving frequency (hopping pattern).

The communication operation of the second embodiment with the above arrangement will be described below.

Figure 11:
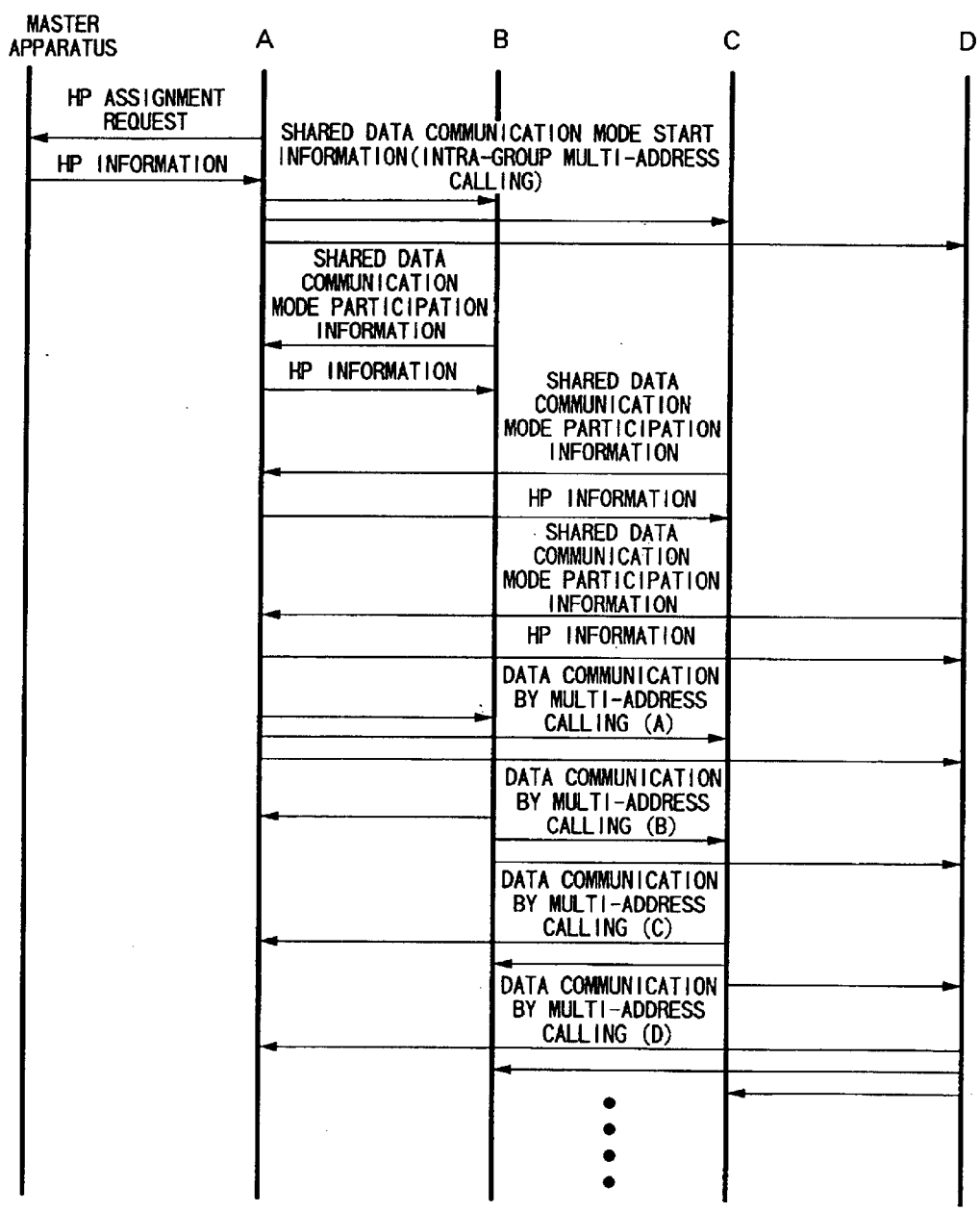
FIG. 11 is a sequence chart showing the communication procedure in the second embodiment.
Figure 12:
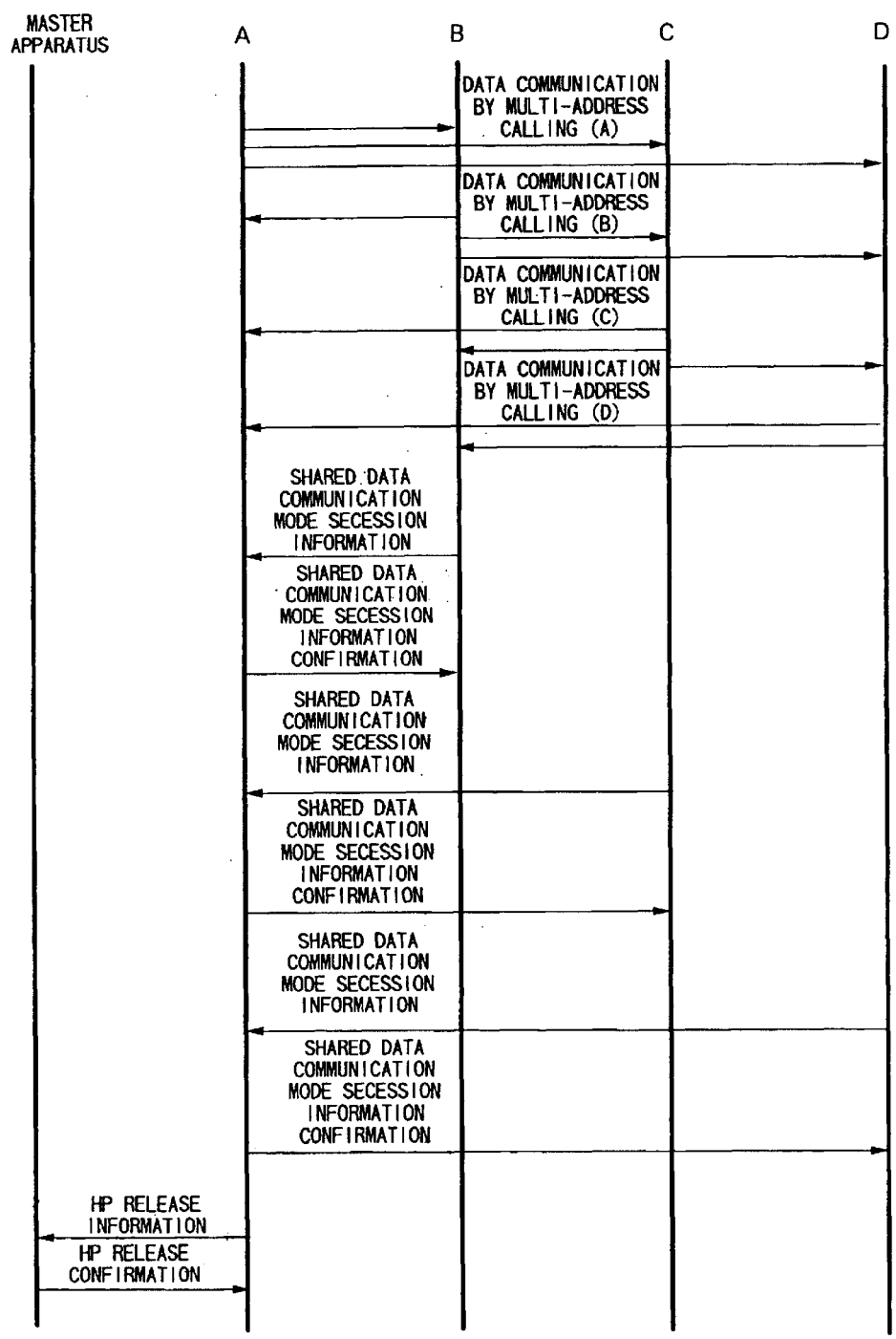
FIG. 12 is a sequence chart showing the communication procedure in the second embodiment.

FIG. 11 is a sequence chart showing the procedure to the start of communication when data is shared in the second embodiment. FIG. 12 is a sequence chart showing the procedure when the shared data communication is complete in the second embodiment.

Figure 13:
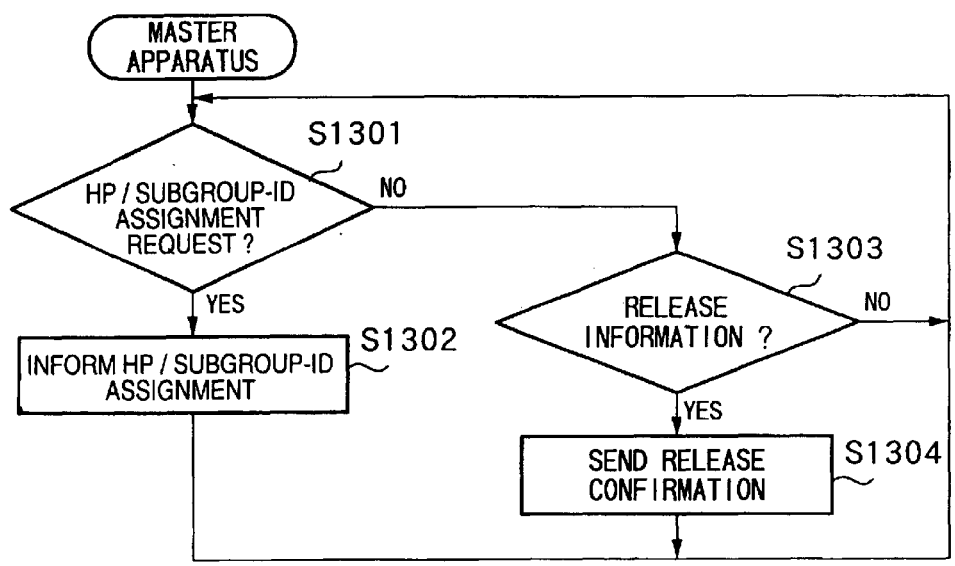
FIG. 13 is a flow chart showing the operation of a master apparatus in the second embodiment.
Figure 14A:
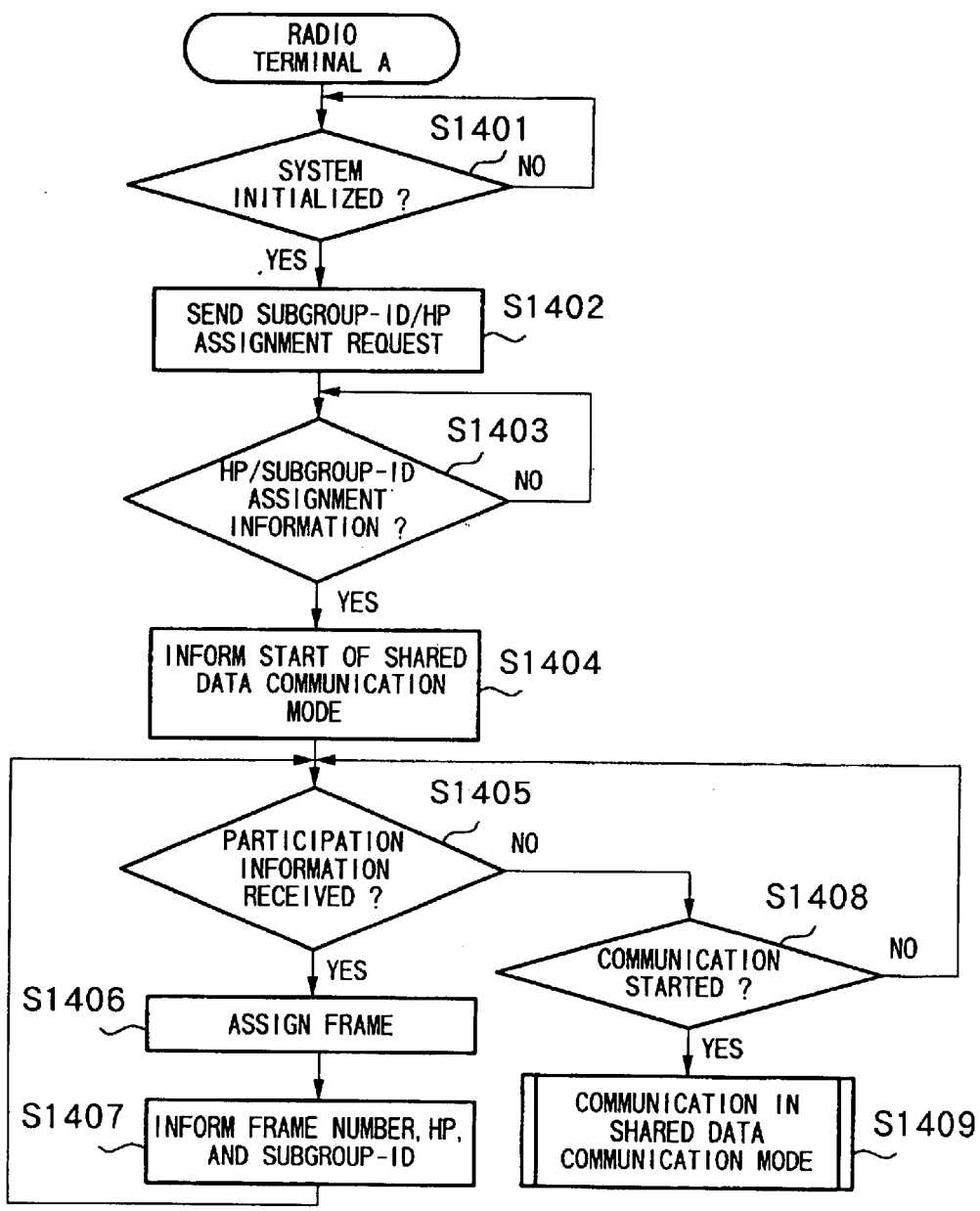
FIGS. 14A and 14B are flow charts showing the operation of a subsidiary apparatus in the second embodiment.
Figure 14B:
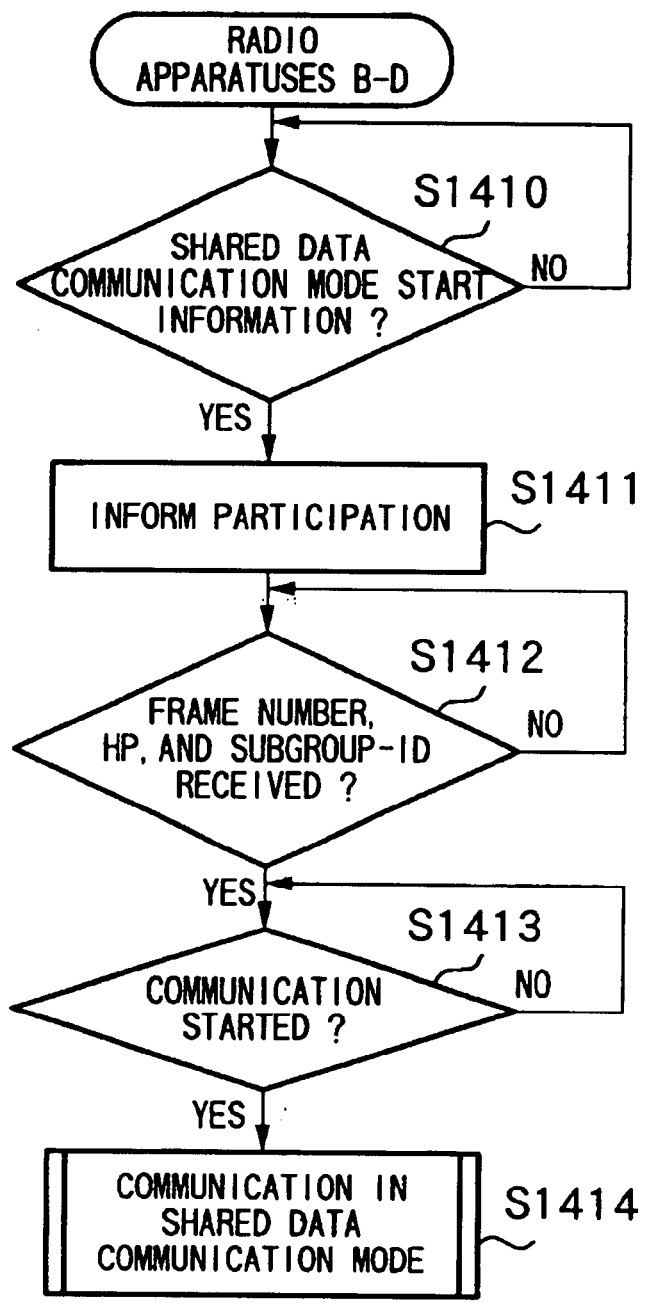
Figure 15A:
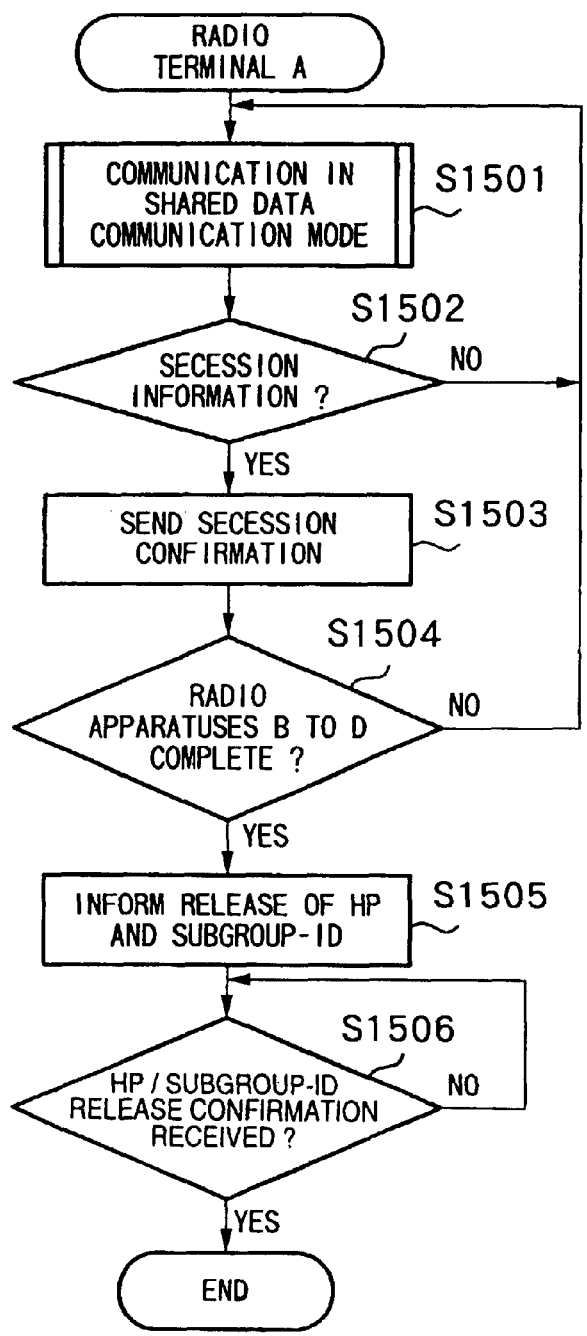
FIGS. 15A and 15B are flow charts showing the operation of the subsidiary apparatus in the second embodiment.
Figure 15B:
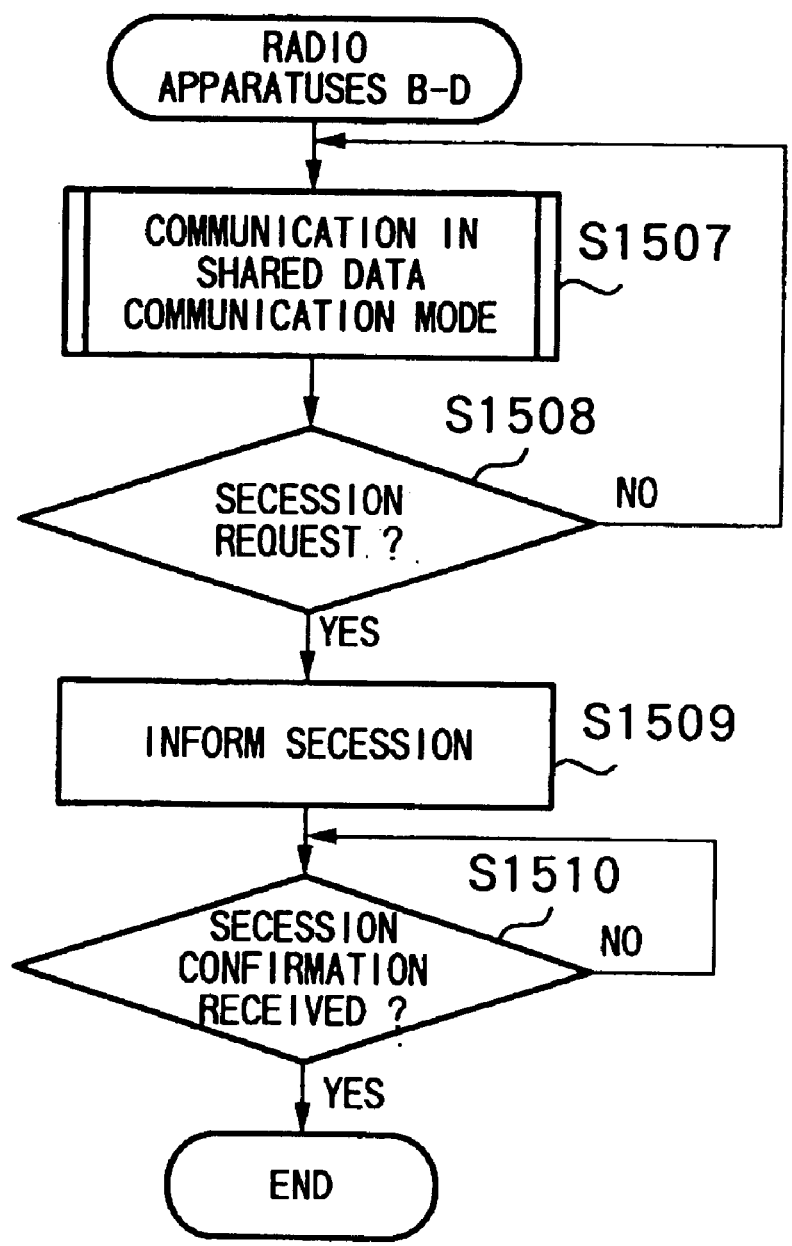

FIGS. 13, 14A, 14B, 15A and 15B are flow charts showing operations in the second embodiment. FIG. 13 shows the operation of a master apparatus. FIGS. 14A and 14B show the operation of each subsidiary apparatus up to the start of a shared data communication mode. FIGS. 15A and 15B show the operation of each subsidiary apparatus up to the completion of the shared data communication mode.

FIG. 16 is a view for conceptually explaining the use status of frequencies in the second embodiment. FIGS. 17A to 17D are views for explaining the formats of a radio frame used in the second embodiment.

First, the formats of a radio frame used in this embodiment will be described below with reference to FIGS. 17A to 17D.

FIG. 17A shows the channel format of the radio frame. In FIG. 17A, reference symbol CNT denotes a frame synchronous channel; GT, a guard time for transmission/reception switching and frequency switching; LCCH, a logic control channel for communicating channel connection information; and Data, a channel for transmitting data to be communicated to a partner.

FIG. 17B shows the format of the CNT channel. In FIG. 17B, reference symbol CS denotes a field for performing carrier sensing; R, a guard time for switching from reception to transmission; PR, a preamble for bit synchronization; SYN, a synchronous word field for frame synchronization; ID, a system ID field containing a number for identifying the system; DM, a guard time for absorbing a delay produced when the receiving side detects a synchronous word; WA, a field containing a radio apparatus ID for wakening up a sleeping radio apparatus; BF, a field storing a numerical value which indicates time information in the system by increasing by one for each frequency hopping; NF, a field storing frequency information used next by the CNT channel in frequency hopping; and CRC, a field storing redundant data for error detection. Note that a numerical value in each field indicates the number of bits of the field.

FIG. 17C shows the basic format of the LCCH, Data, and GT channels. In FIG. 17C, reference symbol UW denotes a synchronous word for establishing byte synchronization in each channel; ID, a transmission destination ID field containing the ID of a transmission partner; and Data Body, a data body containing information to be transmitted. Other fields are identical with the corresponding elements in the CNT channel.

FIG. 17D shows the individual field lengths in the LCCH, Data, and GT channels. A numerical value in each field indicates the number of bits of the field. In this embodiment, the transmission rate is 625 kbps, and the frequency hopping period is 10 ms.

Details of a shared data communication mode in this system will be described below.

As shown in FIG. 9, a plurality of radio apparatuses 92 constitute one system, and all radio apparatuses in this system have the same group-ID and communicate with each other in the system by using this group-ID. Also, one of radio apparatuses having the same group-ID in the system functions as a master apparatus for transmitting the CNT channel. Four radio apparatuses 92 enclosed with the broken lines in FIG. 9 are assigned a common subgroup-ID and share data in this subgroup by using, e.g., a bulletin board electronic conference system (to be simply referred to as an electronic conference system hereinafter). In this embodiment, this operation is called a shared data communication mode. Assume that the radio apparatuses in the subgroup are radio apparatuses A, B, C, and D.

The start procedure of shared data communication will be described below.

As shown in FIGS. 11, 14A, and 14B, a certain one radio apparatus (first subsidiary apparatus) initializes an electronic conference system (S1401) and requests a master apparatus to assign a frequency hopping pattern and subgroup-ID for shared data communication by using an inherent terminal ID and the group-ID through the LCCH channel (S1402). In FIG. 11, the radio apparatus A requests a frequency hopping pattern.

Referring to FIG. 13, the master apparatus receives the request for assignment of a hopping pattern and subgroup-ID (S1301). The master apparatus selects a frequency hopping pattern different from already assigned frequency hopping patterns and a subgroup-ID different from already assigned subgroup-IDs and informs the radio apparatus A, which has requested the assignment of a frequency hopping pattern and subgroup-ID, of the selected frequency hopping pattern and subgroup-ID through the LCCH channel (S1302). After that, the radio apparatus which has requested the assignment of a frequency hopping pattern and subgroup-ID has the shared data communication mode management right (S1403).

Referring to FIG. 11, the radio apparatus A has the shared data communication mode management right. This radio apparatus A having the shared data communication management right informs the other radio apparatuses in the group of the start of the shared data communication mode by multi-address calling through the LCCH channel (S1404).

In FIG. 14B, each radio apparatus receives the shared data communication mode start information (S1410). To perform communication in the shared data communication mode, each radio apparatus transmits shared data communication mode participation information to the radio apparatus having the shared data communication mode management right through the LCCH channel (S1411). The radio apparatus A having the shared data communication mode management right receives the shared data communication mode participation information, stores the ID of the radio apparatus which has transmitted the shared data communication mode participation information, and assigns a frame number which allows transmission by that radio apparatus (S1405 and S1406). The radio apparatus A informs the radio apparatus, which has transmitted the shared data communication mode participation information, of the assigned frame number, frequency hopping pattern, and subgroup-ID through the LCCH channel (S1407).

The assignment of a transmittable frame will be described below with reference to FIG. 16.

In FIG. 16, the ordinate indicates the frequency, and the abscissa indicates the time which is represented by a frame number in this embodiment. Hatched portions indicate a frequency hopping pattern used by the CNT channel for frame synchronization and the LCCH channel. Reference symbols A, B, C, and D denote time periods during which corresponding radio apparatuses can transmit. Referring to FIG. 16, the radio apparatus A having the shared data communication mode management right first sets the transmission right when its own frame number divided by 4 gives a remainder of 1. Similarly, the radio apparatus A sequentially assigns the transmission rights when the frame number divided by 4 gives remainders of 2, 3, and 0. If the number of radio apparatuses which participate in the shared data communication mode is known, the frame number is divided by that known number. In this system, data can be maximally shared by the same number of radio apparatuses as the number of frequency hoppings.

In shared data communication, different applications set different start timings (S1408 and S1413), e.g., one application sets an acceptance termination time and then starts the shared data communication mode, and another application starts the shared data communication mode after the radio apparatus having the shared data communication mode management right assigns the transmission right to the second radio apparatus. In shared data communication, however, each radio apparatus transmits data to be transmitted and the subgroup-ID within a frame time assigned to the apparatus by intra-group multi-address calling (S1409 and S1414). In an electronic conference system, change information added by an information apparatus is transmitted as shared data. Another information apparatus receives this change information and changes its own data in accordance with the change information. The electronic conference system is realized by repeating this process.

The completion procedure of shared data communication will be described next.

As shown in FIGS. 12, 15A, and 15B, to complete shared data communication (S1501 and S1507), the radio apparatuses B to D having no shared data communication mode management right produce a secession request (S1508) and transmit shared data communication mode secession request to the radio apparatus A having the shared data communication mode management right through the LCCH channel (S1509).

The radio apparatus A having the shared data communication mode management right receives the shared data communication mode secession information from each radio apparatus through the LCCH channel (S1502) and internally records the secession of the radio apparatus. The radio apparatus A returns shared data communication mode secession information confirmation to that radio apparatus through the LCCH channel (S15O3).

Each radio apparatus receives the shared data communication mode secession information confirmation (S1510) and completes the shared data communication mode. When all of the radio apparatuses B to D performing shared data communication thus complete the communication (S1504), the radio apparatus A having the shared data communication mode management right informs the master apparatus of release of the frequency hopping pattern and subgroup-ID used through the LCCH channel (S1505).

The master apparatus receives the frequency hopping pattern/subgroup-ID release information from the radio apparatus A (S1303) and releases the frequency hopping pattern and subgroup-ID. The master apparatus then transmits release confirmation to the radio apparatus A through the LCCH channel (S1304).

Upon receiving the frequency hopping pattern/subgroup-ID release conformation from the master apparatus through the LCCH channel, the radio apparatus A having the shared data communication mode management right completes the shared data communication mode and releases the frequency hopping pattern and subgroup-ID assigned to the shared data communication mode (S1506).

In this embodiment, radio apparatuses unable to receive multi-address calling may exist. Therefore, the same multi-address calling can also be performed a plurality of number of times in accordance with the type of application used.

Third Embodiment

The third embodiment of the present invention will be described below.

Figure 18:
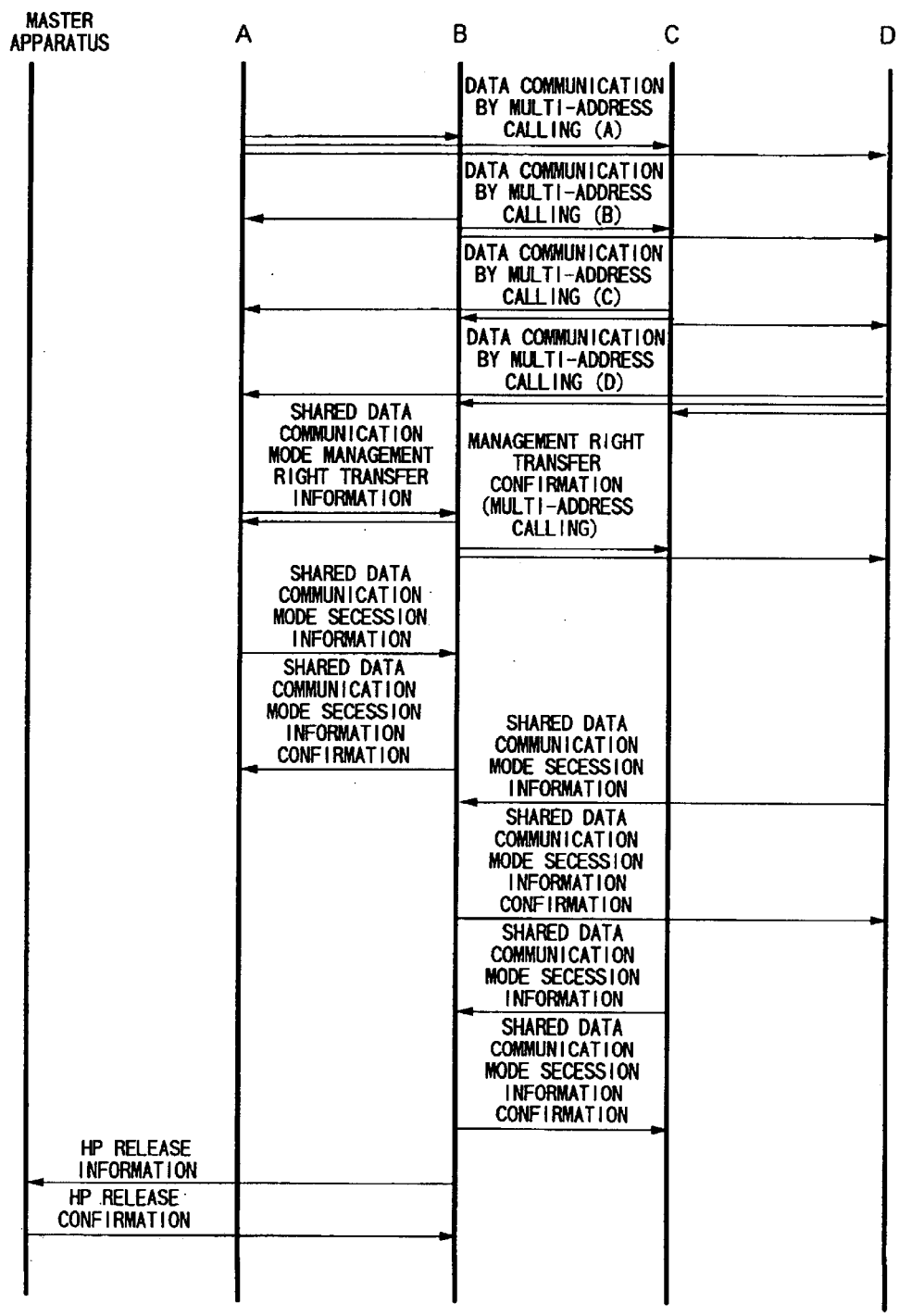
FIG. 18 is a sequence chart showing the communication procedure in the third embodiment.
Figure 19:
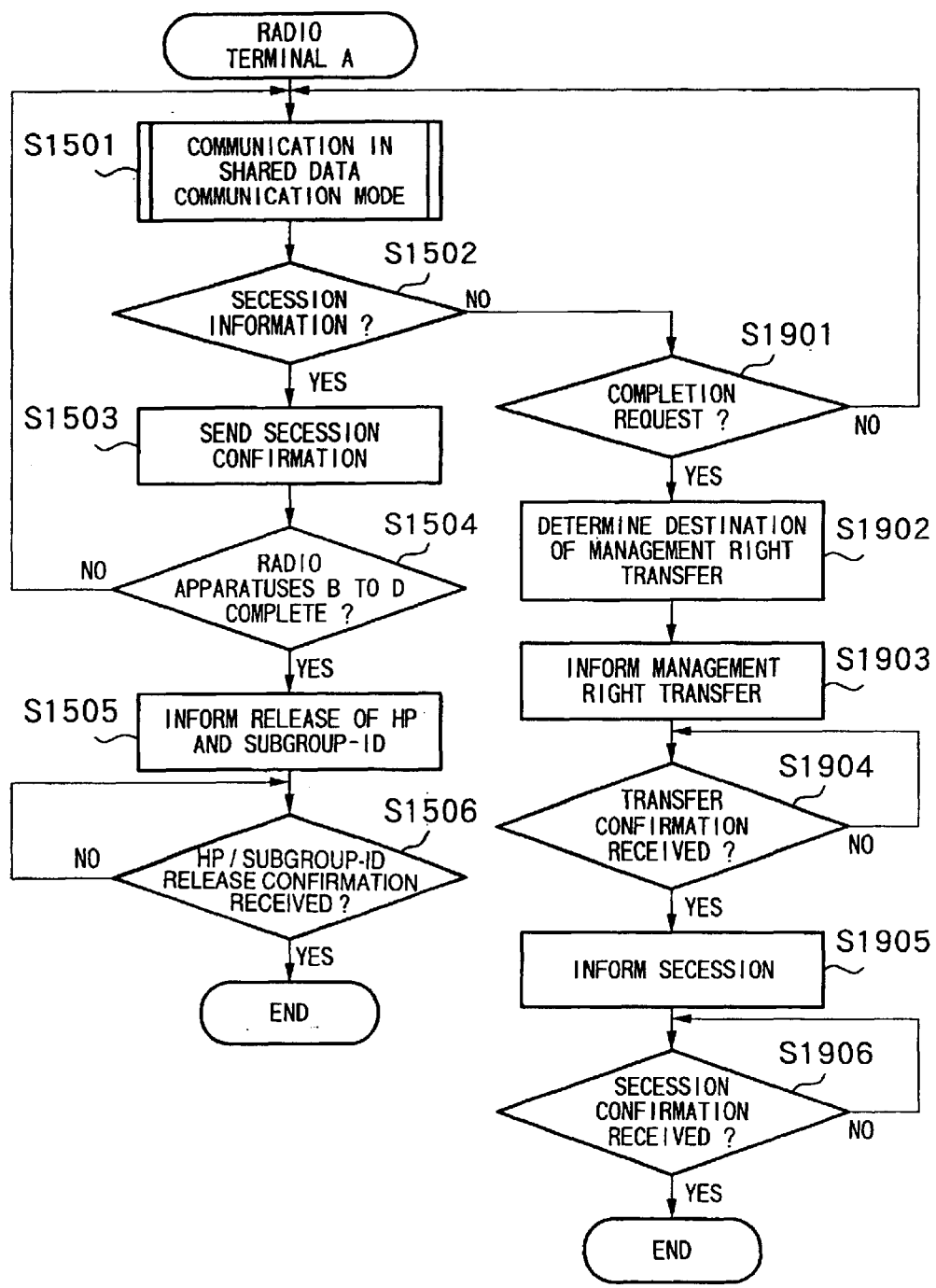
FIG. 19 is a flow chart showing the operation of a subsidiary apparatus in the third embodiment.

FIG. 18 is a sequence chart showing the procedure when shared data communication is complete in this third embodiment. FIGS. 19 and 20 are flow charts showing operations of radio apparatuses when the communication is complete.

In the system of the above second embodiment, an information processing terminal connected to a radio apparatus having the shared data communication mode management right sometimes needs to stop shared data communication earlier and perform another communication. If this is the case, in the completion procedure of the second embodiment, the radio apparatus having the shared data communication mode management right can complete the shared data communication mode only when other radio apparatuses than the radio apparatus having the shared data communication mode management right complete the shared data communication mode. Therefore, following the procedure as shown in FIGS. 18 to 20, the shared data communication mode management right is transferred to another radio apparatus to allow the radio apparatus initially having the shared data communication mode management right to complete the shared data communication mode earlier.

In this third embodiment, the radio apparatus priority order in which the shared data communication mode management right is transferred is previously determined to allow each apparatus to prepare for acquisition of the shared data communication mode management right. Referring to FIGS. 18 to 20, the shared data communication mode management right is transferred in the order of radio apparatuses A, B, C, and D. Note that the same numbers as in FIGS. 15A and 15B denote the same steps in FIGS. 19 and 20, and a detailed description thereof will be omitted.

When a radio apparatus having the shared data communication mode management right is instructed to complete a shared data communication mode by an information apparatus 91 connected to the radio apparatus (S1901), this radio apparatus checks which one of currently communicating radio apparatuses has the highest priority of transfer of the shared data communication mode management right (S1902), and transmits shared data communication mode management right transfer information to that radio apparatus through an LCCH channel (S1903). The radio apparatus also transmits information pertaining to transmission right assignment necessary to hold the shared data communication mode management right and information of radio apparatuses participating in the shared data communication mode through the LCCH channel.

The radio apparatus which has received the shared data communication mode management right transfer information (S2001) informs the other radio apparatuses of the transfer of the shared data communication mode management right by intra-group multi-address calling through the LCCH channel (S2002). The radio apparatus initially having the shared data communication mode management right receives this information and stops the shared data communication mode management process. Also, the radio apparatus transmits shared data communication mode secession information to the radio apparatus having the new shared data communication mode management right through the LCCH channel (S1904 and S1905).

The radio apparatus having the new shared data communication mode management right receives the secession information (S2003), internally records the secession of that radio apparatus, and informs the radio apparatus, which completes the shared data communication mode, of shared data communication mode secession information confirmation (S2011). The radio apparatus which has received this shared data communication mode secession information confirmation completes the shared data communication mode (S1906).

When another radio apparatus is to complete the shared data communication mode earlier than the radio apparatus having the shared data communication mode management right, the same processing as in the second embodiment is performed. When all radio apparatuses complete the communication mode, the frequency hopping pattern is released (S2012 to S2014). Also, the above procedure is repeated to further transfer the shared data communication mode management right (S2004 to S2010).

Referring to FIG. 18, on the basis of the information of radio apparatuses participating in the shared data communication mode and the radio apparatus priority order in which the shared data communication mode management right is transferred, the radio apparatus A determines that the shared data communication mode management right is to be transferred to the radio apparatus B, and transmits shared data communication mode management right information to the radio apparatus B through the LCCH channel. More specifically, the radio apparatus A informs the radio apparatus B that the radio apparatuses A, B, C, and D are participating in this shared data communication and have the transmission rights when the frame number divided by 4 gives remainders of 1, 2, 3, and 0, respectively.

After that, the radio apparatus B informs the other apparatuses of the transfer of the shared data communication mode management right by intra-group multi-address calling through the LCCH channel. The radio apparatus A receives this information and stops the shared data communication mode management process. The radio apparatus A also transmits shared data communication mode secession information to the radio apparatus B having the new shared data communication mode management right through the LCCH channel.

The radio apparatus B having the shared data communication mode management right internally records the secession of the radio apparatus A and informs the radio apparatus A of shared data communication mode secession release information confirmation. The radio apparatus A receives this shared data communication mode secession information confirmation and completes the shared data communication mode. When another radio apparatus is to complete the shared data communication mode earlier than the radio apparatus having the shared data communication mode management right, the same processing as in the second embodiment is performed. Also, the above procedure is repeated to further transfer the shared data communication mode management right.

In this third embodiment, the management right transfer order is determined by using the transmission right use order. However, another order can also be used.

Fourth Embodiment

The fourth embodiment of the present invention will be described below.

Figure 21A:
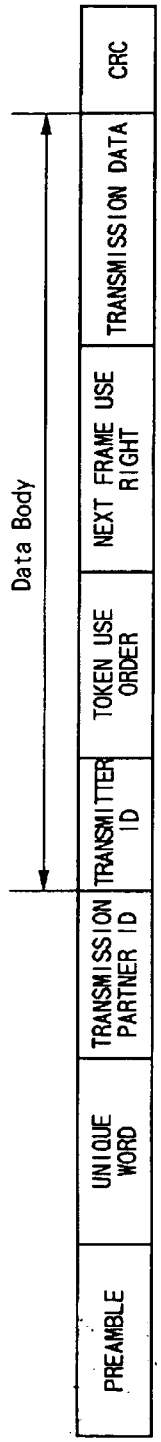
FIGS. 21A and 21B are views for explaining the formats of a radio frame and the transition of frequency hopping in the fourth embodiment.
Figure 21B:
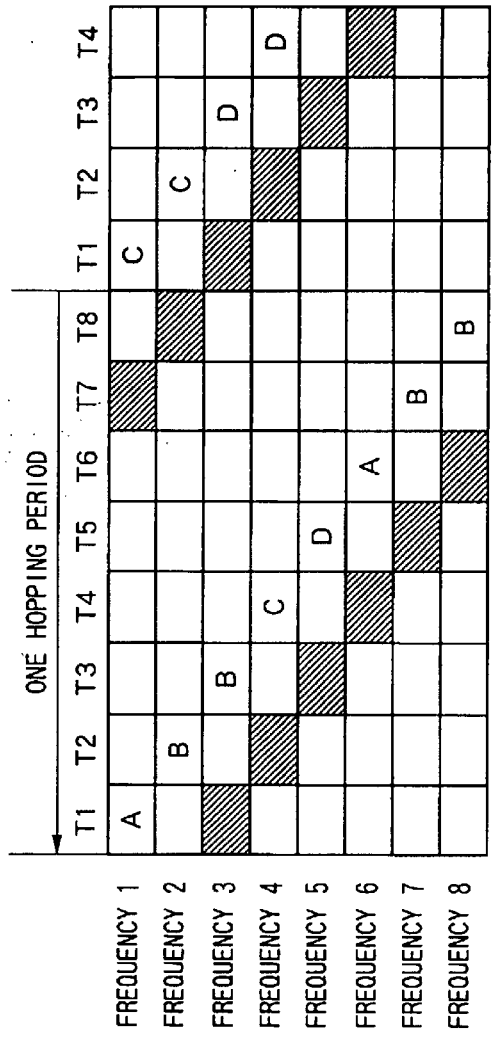
Figure 22:
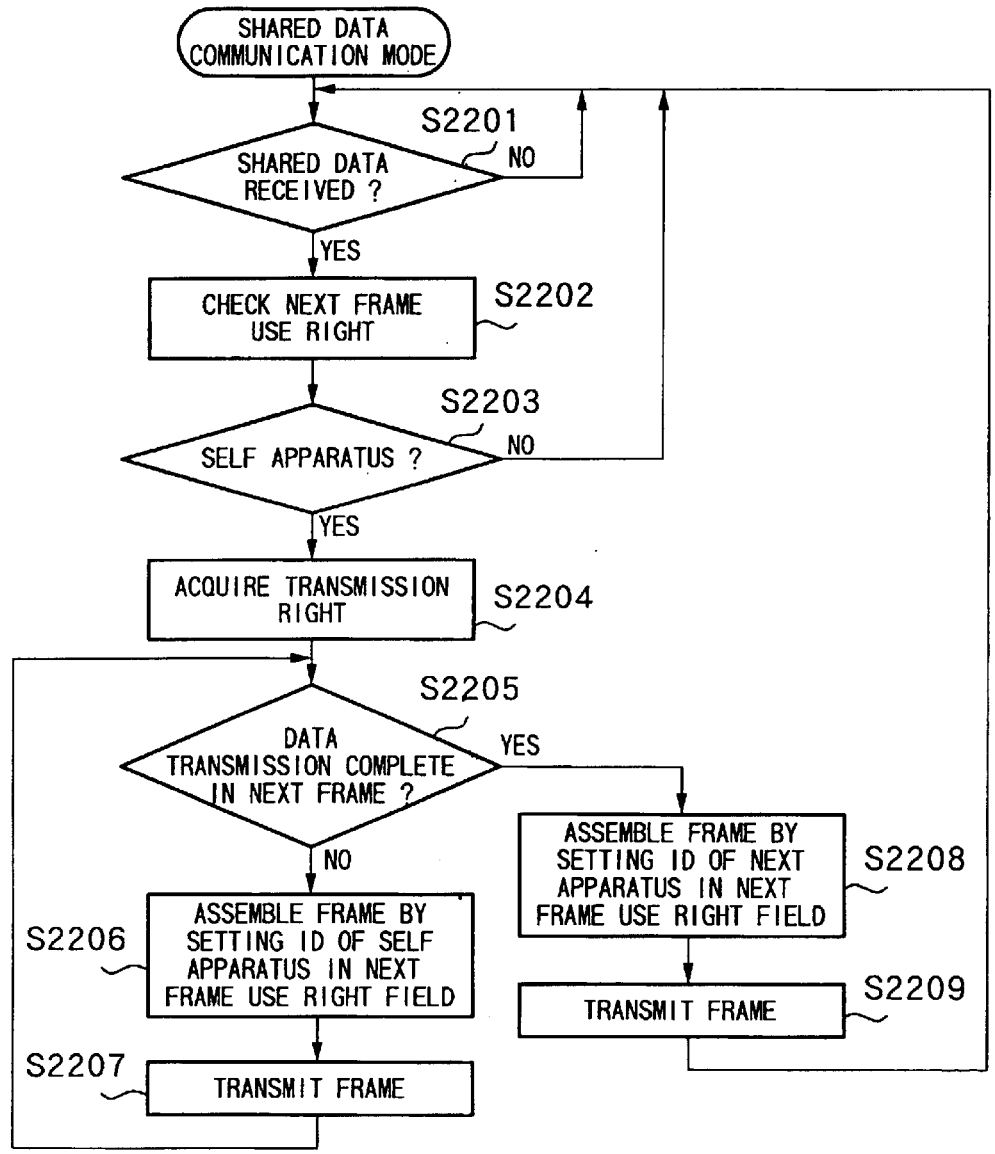
FIG. 22 is a flow chart showing the operation of transferring the transmission right between subsidiary apparatuses in the fourth embodiment.

FIG. 21A is a view for explaining the format of a data channel used in a radio apparatus transmission right assigning method according to this fourth embodiment. FIG. 21B is a view for conceptually explaining the use status of frequencies in this radio apparatus transmission right assigning method of the fourth embodiment. FIG. 22 is a flow chart showing the transmission right transfer operation in this embodiment.

The method of assigning the transmission right to a radio apparatus by using a frame time as in the second embodiment cannot easily control communication when data to be transmitted at once is long and loses its meaning if it is separately transmitted, or when radio apparatuses perform shared data communication exceeding the number of frequency hoppings. This problem can be solved by the use of a token indicating the transmission right regardless of a frame time.

As shown in FIG. 21A, a data channel is divided into a transmitter ID field, token use order field, next frame use right field, and transmission data field.

Referring to FIG. 21B, the ordinate indicates the frequency, and the abscissa indicates the time which is expressed by a frame number in this embodiment. Hatched portions indicate a frequency hopping pattern used by a CNT channel for frame synchronization and an LCCH channel. Reference symbols A, B, C, and D in FIG. 21B denote time periods during which corresponding radio apparatuses can transmit.

In FIG. 21B, a radio apparatus A having the shared data communication mode management right sets the transmission rights in order of acceptance of shared data communication mode participation information. In this embodiment, if four radio apparatuses A, B, C, and D transmit the shared data communication mode participation information to the radio apparatus A having the shared data communication mode management right in the order of the radio apparatuses A, B, C, and D, the transmission right is transferred in the order of radio apparatus A→radio apparatus B→radio apparatus C→radio apparatus D→radio apparatus A.

Assume, as shown in FIG. 21B, that the radio apparatus A has the transmission right in frame time T1. Assume also that the radio apparatus A transmits data having a data amount transmittable at once in this frame time T1. In this data transmission, the ID of the radio apparatus A is set in the transmitter ID field, the IDs of the individual radio apparatuses are set in the token use order field in the order of radio apparatus A→radio apparatus B→radio apparatus C→radio apparatus D. The ID of the radio apparatus B is set in the next frame use right field. Shared data communication data is set in the transmission data field.

Since the radio apparatus B is designated in the next frame use right field in frame time T1, this radio apparatus B acquires the transmission right when frame time T2 begins. Assume that the radio apparatus B is to transmit data whose data amount cannot be transmitted within one frame time, so the radio apparatus B continuously transmits the data in next frame time T3. In this data transmission, the ID of the radio apparatus B is set in the transmitter ID field, the IDs of the individual radio apparatuses are set in the token use order field in the order of radio apparatus A→radio apparatus B→radio apparatus C→radio apparatus D. The ID of the radio apparatus B is set in the next frame use right field. Shared data communication data is set in the transmission data field.

Since the radio apparatus B has the next frame use right in frame time T2, this radio apparatus B still has the transmission right in frame time T3. The radio apparatus B transmits residual data which cannot be transmitted in frame time T2. In this data transmission, the ID of the radio apparatus B is set in the transmitter ID field, the IDs of the individual radio apparatuses are set in the token use order field in the order of radio apparatus A→radio apparatus B→radio apparatus C→radio apparatus D. The ID of the radio apparatus C is set in the next frame use right field. Shared data communication data is set in the transmission data field.

Referring to FIG. 22, each radio apparatus receives the shared data (S2201) and checks the next frame use right field (S2202). If the ID of this radio apparatus is stored in the field (S2203), the radio apparatus acquires the next transmission right (S2204). Therefore, this radio apparatus looks up the data length of shared data to be transmitted next and checks whether the shared data can be completely transmitted in the next frame (S2205).

If NO in step S2205, the radio apparatus assembles a frame by storing its own ID in the next frame use right field (S2206) and transmits the data in the next frame (S2207). After that, the flow returns to step S2205 to repeat the transmitting operation.

If YES in step S2205, the radio apparatus assembles a frame by storing the ID of the next radio apparatus in the next frame use right field (S2208), and transmission in the next frame is performed (S2209). After that, the flow returns to step S2201 to wait for reception.

The transmission right is thus transferred between radio apparatuses participating in shared data communication. Accordingly, the method can control communication even when data to be transmitted at once is long and loses its meaning if it is separately transmitted, or when radio apparatuses perform shared data communication exceeding the number of frequency hoppings.

To assign the transmission right to a radio apparatus which participates during communication, this radio apparatus is set in the token use order field subsequently to the last radio apparatus at that time. Also, when a radio apparatus having the shared data communication mode management right first completes the shared data communication mode as in the third embodiment, the first radio apparatus in the token use order field can be designated as a radio apparatus which acquires the shared data communication mode management right next. These rules can simplify the processes.

Fifth Embodiment

The fifth embodiment of the present invention will be described below.

Figure 23:
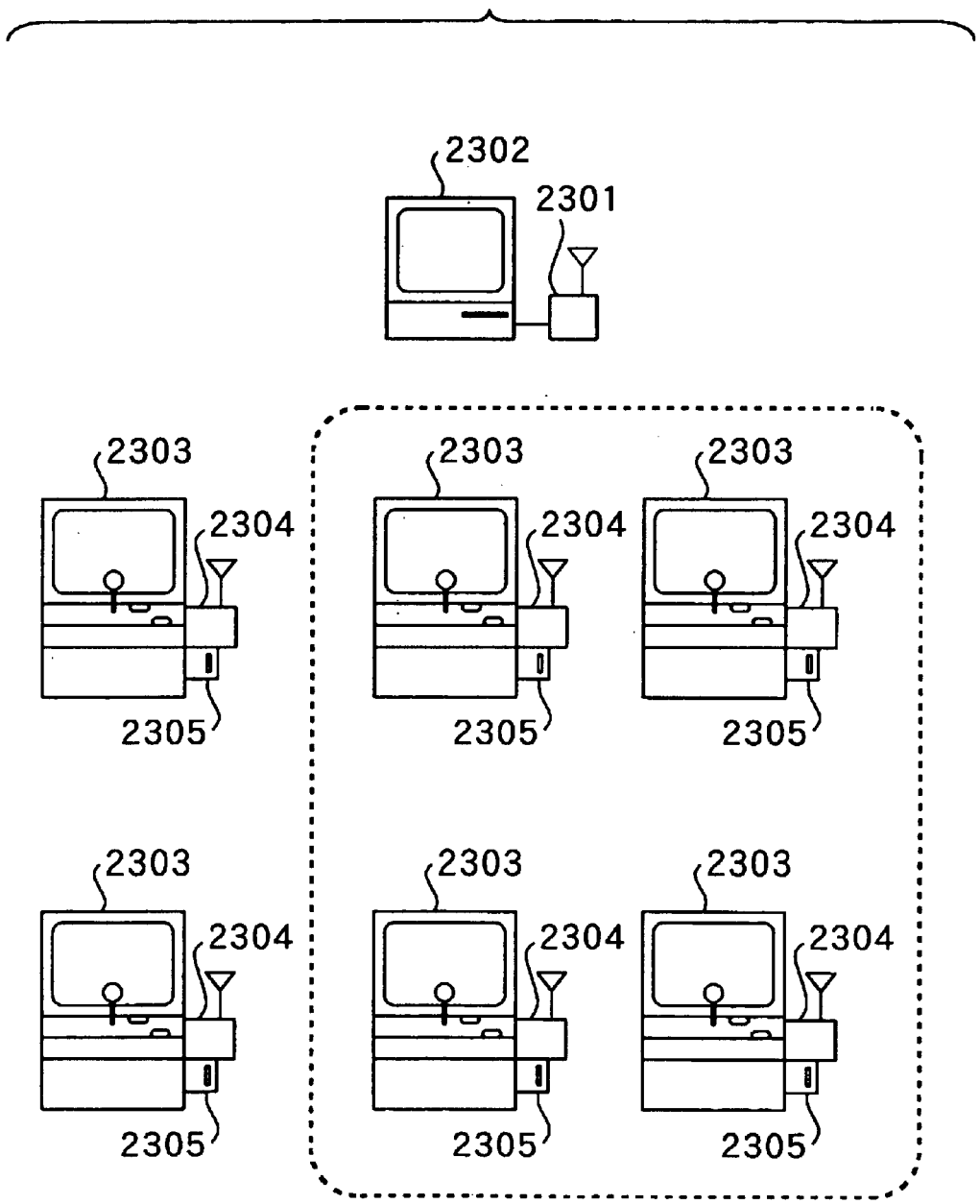
FIG. 23 is a view for explaining the system configuration in the fifth embodiment.
Figure 24:
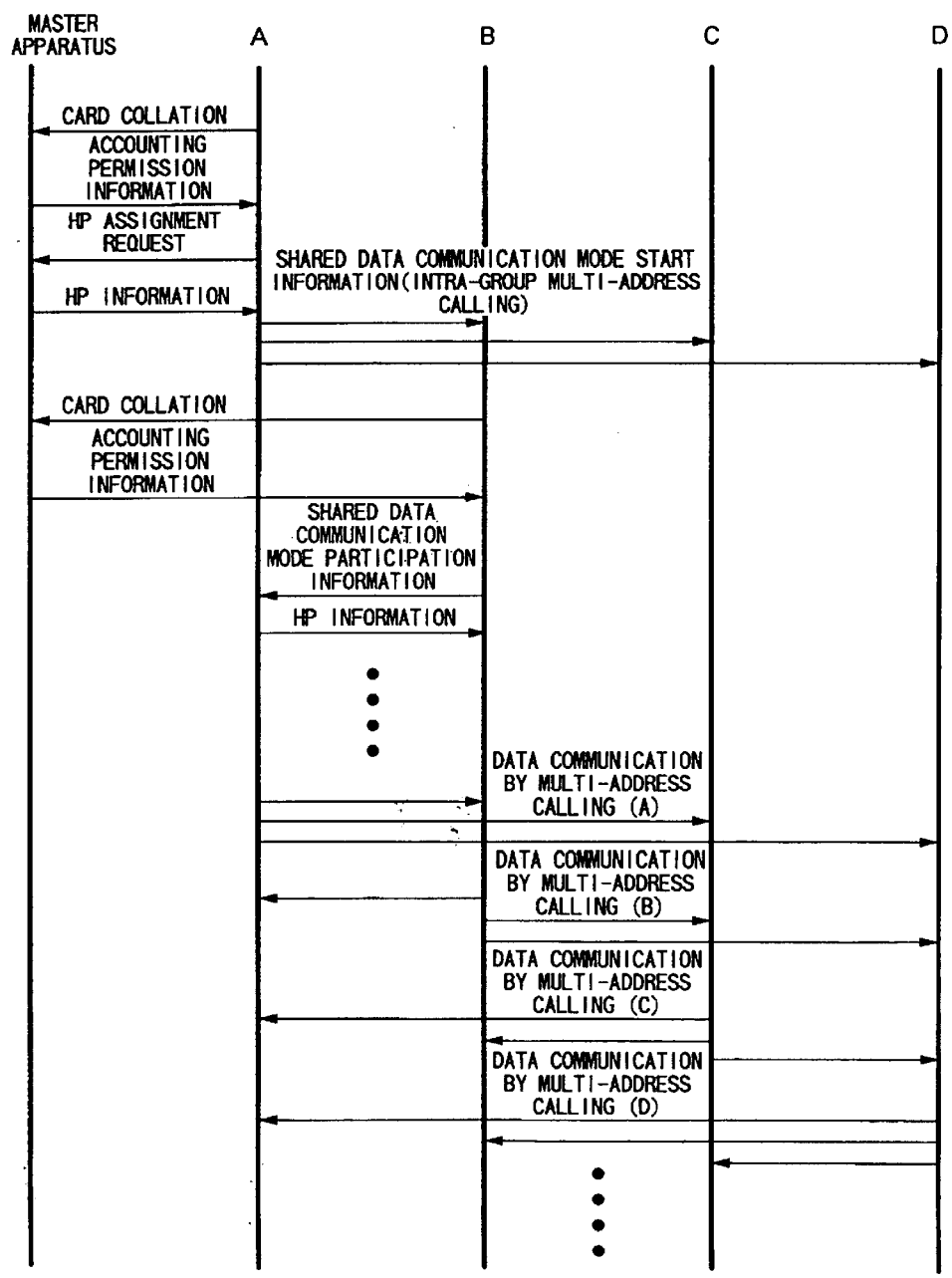
FIG. 24 is a sequence chart showing the communication procedure in the fifth embodiment.

FIG. 23 is a view for explaining the system configuration in the fifth embodiment of the present invention. FIG. 24 is a sequence chart showing the procedure before communication is started in a shared data communication mode in the fifth embodiment. FIGS. 25A and 25B are flow charts showing operations in the procedure. FIGS. 26A to 26D are views for explaining the formats of a radio frame used in the fifth embodiment.

First, the formats of a radio frame used in the fifth embodiment will be described below with reference to FIGS. 26A to 26D.

FIG. 26A shows the channel format of the radio frame. In FIG. 26A, reference symbol CNT denotes a frame synchronous channel; GT, a guard channel for transmission/reception switching and frequency switching; LCCH, a logic control channel for communicating channel connection information; and Data1 and Data2, channels for transmitting data to be communicated to a partner.

FIG. 26B shows the format of the CNT channel. In FIG. 26B, reference symbol CS denotes a field for performing carrier sensing; R, a guard time for switching from reception to transmission; PR, a preamble for bit synchronization; SYN, a synchronous word field for frame synchronization; ID, a system ID field containing a number for identifying the system; DM, a guard time for absorbing a delay produced when the receiving side detects a synchronous word; WA, a field containing a radio apparatus ID for wakening up a sleeping radio apparatus; BF, a field storing a numerical value which indicates time information in the system by increasing by one for each frequency hopping; NF, a field storing frequency information used next by the CNT channel in frequency hopping; and CRC, a field storing redundant data for error detection. Note that a numerical value in each field indicates the number of bits of the field.

FIG. 26C shows the basic format of each channel. In FIG. 17C, reference symbol UW denotes a synchronous word for establishing byte synchronization in each channel; ID, a transmission destination ID field containing the ID of a transmission partner; and Data Body, a data body containing information to be transmitted.

FIG. 26D shows the lengths of the LCCH, Data1, Data2, and GT channels and the field lengths. A numerical value in each field indicates the number of bits of the field. In this embodiment, the transmission rate is 625 kbps, and the frequency hopping period is 10 ms.

The system configuration of this fifth embodiment will be described below with reference to FIG. 23. Referring to FIG. 23, a radio apparatus 2301 is a frequency hopping type radio apparatus and connected to a computer 2302 for processing accounting information. A radio apparatus (subsidiary apparatus) 2304 is also a frequency hopping type radio apparatus and connected to a video game machine 2303. Each video game machine 2303 has an accounting apparatus 2305. Note that the broken lines in FIG. 23 indicate a group in which group members can compete with each other by sharing data by using video game machines of the same kind. Note also that the radio apparatuses 2301 and 2304 have, e.g., the arrangement as shown in FIG. 10.

In this system, a competing game can be performed while the accounting statuses i.e., the use statuses of a plurality of video game machines are monitored. The radio apparatus 2301 connected to the computer 2302 for processing accounting information is set as a master apparatus.

Pieces of accounting information are collectively transmitted to the master apparatus when no competing game data is transmitted by a shared data communication mode. A certain amount of accounting data can also be collectively transmitted even when no competing game is performed. Since this reduces the radio use frequency, the utilization efficiency of radio frequency can be increased.

When accounting is performed by using a prepaid card, it is preferable to be able to check whether the card is valid. Therefore, the card is collated by the master apparatus after being inserted. FIGS. 24, 25A, and 25B show this communication start procedure. For the simplicity of explanation, assume that a group for performing a competing game is formed by radio apparatuses A, B, C, and D. Assume also that a radio frame has the formats shown in FIGS. 26A to 26D.

Of the two data channels (Data1 and Data2) shown in FIG. 26A, data channel 1 (Data1) is used to transmit/receive prepaid card data with respect to the master apparatus, and data channel 2 (Data2) is used to transmit/receive shared data communication mode data used in a competing game. Data channel 1 uses the same frequency hopping pattern as the CNT channel for frame synchronization and the LCCH channel for channel connection.

When accounting is performed by using coins, the system can also be realized by the radio frame format shown in FIG. 17A.

The procedure shown in FIGS. 24, 25A, and 25B will be described below.

First, the system is initialized (S2501), and a prepaid card is inserted into one of the apparatuses (S2502). The information of this prepaid card is transmitted to the master apparatus to request the master apparatus to collate the prepaid card (S2503).

On the basis of the result of collation, the master apparatus informs the requesting radio apparatus of whether accounting is permitted. If accounting is permitted, the master apparatus transmits accounting permission information to the requesting radio apparatus. The requesting radio apparatus receives this accounting permission information (S2504) and requests the master apparatus to assign a frequency hopping pattern and subgroup-ID for shared data communication by using an inherent terminal ID and a group-ID through the LCCH channel (S2505). Referring to FIGS. 24, 25A, and 25B, a prepaid card is first inserted into the radio apparatus A, so the radio apparatus A requests the master apparatus to collate the prepaid card, and the collation result indicates that accounting is possible. Therefore, the master apparatus transmits accounting permission information to the radio apparatus (first subsidiary apparatus) A.

Upon receiving the accounting permission information, the radio apparatus A performs an accounting process for the prepaid card and requests the master apparatus to transmit a frequency hopping pattern and subgroup-ID for use in the shared data communication mode. The master apparatus chooses a frequency hopping pattern different from frequency hopping patterns already assigned to other radio apparatuses and a subgroup-ID different from already assigned subgroup-IDs. The master apparatus informs the radio apparatus A, which has requested the assignment of a frequency hopping pattern and subgroup-ID, of the frequency hopping pattern and subgroup-ID for use in the shared data communication mode through the LCCH channel.

After that, the radio apparatus which has requested the assignment of a frequency hopping pattern and subgroup-ID has the shared data communication mode management right. Referring to FIGS. 24, 25A, and 25B, the radio apparatus A has this shared data communication mode management right. The radio apparatus A having the shared data communication mode management right informs the other radio apparatuses in the group of the start of the shared data communication mode by multi-address calling through the LCCH channel (S2507).

Each radio apparatus which has received the shared data communication mode start information can accept participation into the competing game (S2521). If a prepaid card is inserted into a game machine (S2522), this game machine transmits the information of this prepaid card to the master apparatus and requests the master apparatus to collate the prepaid card (S2523). On the basis of the result of collation, the master apparatus informs the requesting radio apparatus of whether accounting is permitted.

If accounting is permitted (S2524), the radio apparatus transmits shared data communication mode participation information to the radio apparatus having the shared data communication mode management right through the LCCH channel (S2525).

The radio apparatus A having the shared data communication mode management right receives the shared data communication mode participation information (S2508) and stores the ID of the radio apparatus which has transmitted the shared data communication mode participation information. Then, the radio apparatus A assigns a frame number which can be transmitted by that radio apparatus (S2509) and informs the radio apparatus, which has transmitted the shared data communication mode participation information, of the assigned frame number, frequency hopping pattern, and subgroup-ID through the LCCH channel (S2510 and S2526).

The shared data communication accepts participation within an acceptance termination time designated by a game machine and starts the data shared data communication mode (S2511, S2512, S2527, and S2528).

In the shared data communication mode, the transmission right is set in each frame time as in the second embodiment or transferred by using a token as in the fourth embodiment. Which method is to be used is determined on the basis of a data amount to be exchanged between the game machines or a data amount to be transmitted at once.

When the shared data communication mode begins, the radio apparatuses participating in the shared data communication mode perform shared data communication by using the frequency hopping pattern designated in data channel 2 by the master apparatus.

The completion procedure of the shared data communication mode can be the procedure shown in FIG. 12 of the second embodiment or the procedure explained in the third embodiment. Which procedure is to be followed is determined on the basis of the specification of the game, e.g., whether a machine completing the game can participate in the next game or the competing game is not complete unless all machines complete the game.

In this embodiment, radio apparatuses unable to receive multi-address calling may exist. Therefore, the same multi-address calling can also be performed a plurality of number of times in accordance with the type of application used.

In each of the above embodiments, the present invention is used in an electronic conference system or a competing game. However, the present invention is extensively applicable to other systems.

In each embodiment as described above, several radio apparatuses can share data without using any high-speed apparatus as a server. This can realize a radio communication system such as a bulletin board electronic conference system or a competing game.

Sixth Embodiment

In each of the second to fifth embodiments described above, a radio apparatus for performing communication is determined for each hopping pattern frequency as shown in FIG. 16.

Figure 27:
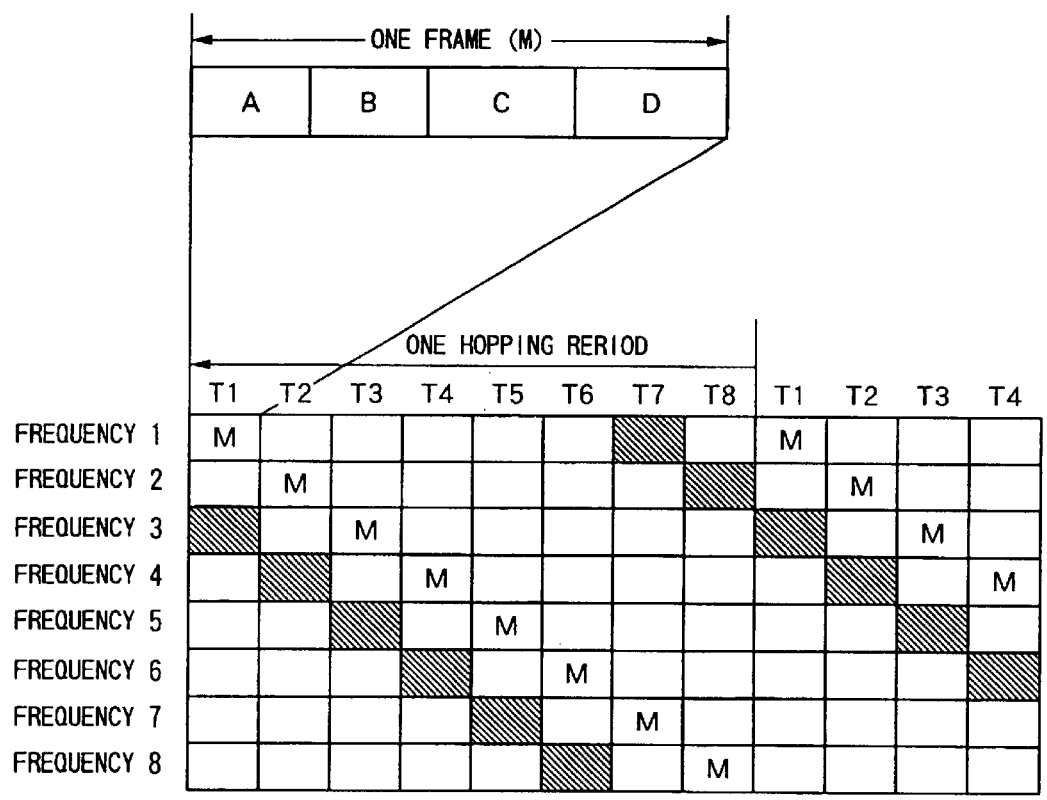
FIG. 27 is a view for explaining the format of a radio frame and the transition of frequency hopping in the sixth embodiment.

In the sixth embodiment, as shown in FIG. 27, one communication frame M is divided into areas to be used by a plurality of radio apparatuses to achieve time division multiplexing. (In FIG. 27, the communication frame M is divided into four areas for radio apparatuses A, B, C, and D to accomplish time division multiplexing.)

The present invention can be practiced even when this communication frame is used.

As has been described above, the present invention can realize shared data real-time communication between a plurality of radio apparatuses without using any high-speed server.

Also, a subgroup can be dynamically formed by any arbitrary number of radio apparatuses.

Furthermore, a subgroup-ID for performing communication in a subgroup can be dynamically assigned to an arbitrary number of radio apparatuses.

Accordingly, subgroup communication can be efficiently performed.

As many apparently widely different embodiments of the present invention can be made without departing from the spirit and scope thereof, it is to be understood that the invention is not limited to the specific embodiments thereof except as defined in the appended claims.

What is claimed is:

1. A radio communication apparatus comprising:
   requesting means for requesting from a first communication apparatus which manages a plurality of sets of group identification information, a group identification information for a group formed by a part of communication apparatuses in a communication system;
   inquiring means for inquiring of a second communication apparatus whether the second communication apparatus participates in group communication using the group identification information transmitted by the first communication apparatus in response to the request by said requesting means; and
   communicating means for performing the group communication in the group with the second communication apparatus on the basis of the group identification information, in accordance with a response from the second communication apparatus in response to the inquiry by said inquiring means.

2. The apparatus according to claim 1, wherein said communicating means performs multi-address calling in the group on the basis of the group identification information.

3. The apparatus according to claim 1, further comprising informing means for informing the second communication apparatus of the group identification information, in accordance with a response from the second communication apparatus to the inquiry by said inquiring means.

4. The apparatus according to claim 1, wherein the transmitted group identification information is released when the group communication is complete.

5. The apparatus according to claim 1, wherein the group identification information is a frequency hopping pattern used in performing frequency hopping communication.

6. The apparatus according to claim 1, wherein the group identification information is transmitted by a communication control apparatus in the communication system.

7. The apparatus according to claim 1, further comprising storing means for storing identification information identifying the second communication apparatus which has transmitted the response in response to the inquiry by said inquiring means.

8. A method of performing radio communication, by a radio communication apparatus, comprising the steps of:

requesting from a first communication apparatus which manages a plurality of sets of group identification information, a group identification information for a group formed by a part of communication apparatuses in a communication system;

inquiring of a second communication apparatus whether the second communication apparatus participates in group communication using the group identification information transmitted by the first communication apparatus in response to the request in said requesting step; and performing the group communication in the group with the second communication apparatus on the basis of the group identification information, in accordance with response from the second communication apparatus in response to the inquiry in said inquiring step.

9. A radio communication apparatus comprising:

a requesting unit adapted to request from a first communication apparatus which manages a plurality of sets of group identification information, a group identification information a group formed by a part of communication apparatuses in a communication system;

an inquiring unit adapted to inquire of a second communication apparatus whether the second communication apparatus participates in group communication using the group identification information transmitted by the first communication apparatus in response to the request by said requesting unit; and an informing unit adapted to inform the second communication apparatus of the group identification information, in accordance with a response from the second communication apparatus in response to the inquiry by said inquiring unit.

10. The apparatus according to claim 9, further comprising a storing unit adapted to store identification information identifying the second communication apparatus which has transmitted the response in response to the inquiry by said inquiring unit.

11. The apparatus according to claim 9, wherein the transmitted group identification information is released when the group communication is complete.

12. A method of performing radio communication by a radio communication apparatus, comprising the steps of:

requesting from a first communication apparatus which manages a plurality of sets of group identification information, a group identification information for a group formed by a part of communication apparatuses in a communication system;

inquiring of a second communication apparatus whether the second communication apparatus participates in group communication using the group identification information transmitted by the first communication apparatus in response to the request in said requesting step; and informing the second communication apparatus of the group identification information, in accordance with a response from the second communication apparatus in response to the inquiry in said inquiring step.

13. A computer-executable program, stored in a computer-readable medium, in executable form, for executing a method of performing radio communication by a radio communication apparatus, comprising the steps of:

requesting from a first communication apparatus which manages a plurality of sets of group identification information, a group identification information for a group formed by a part of communication apparatuses in a communication system;

inquiring of a second communication apparatus whether the second communication apparatus participates in group communication using the group identification information transmitted by the first communication apparatus in response to the request by said requesting step; and informing the second communication apparatus of the group identification information, in accordance with a response from the second communication apparatus in response to the inquiry in said inquiring step.

14. A computer-executable program, stored in a computer-readable medium, in executable form, for executing a method of performing radio communication by a radio communication apparatus, comprising the steps of:

requesting from a first communication apparatus which manages a plurality of sets of group identification information, a group identification information for a group formed by a part of communication apparatuses in a communication system;

inquiring of a second communication apparatus whether the second communication apparatus participates in group communication using the group identification information transmitted by the first communication apparatus in response to the request in said requesting step; and performing the group communication in the group with the second communication apparatus on the basis of the group identification information in accordance with a response from the second communication apparatus in response to the inquiry in said inquiring step.

* * * * *

UNITED STATES PATENT AND TRADEMARK OFFICE
CERTIFICATE OF CORRECTION

| | |
|---|---|
| PATENT NO. | : 7,218,663 B1 |
| APPLICATION NO. | : 09/219747 |
| DATED | : May 15, 2007 |
| INVENTOR(S) | : Akane Yokota et al. |

It is certified that error appears in the above-identified patent and that said Letters Patent is hereby corrected as shown below:

ON COVER PAGE AT (56) REFERENCES CITED

Foreign Patent Documents, "JP 6-125544 5/1990" should read --JP 2-125544 5/1990--;

COLUMN 3

Line 1, "indentification" should read --identification--.

COLUMN 11

Line 4, "(S15O3)." should read --(S1503).--; and
    Line 21, "conformation" should read --confirmation--.

COLUMN 15

Line 58, "and connected" should read --and is connected--; and
    Line 61, "and connected" should read --and is connected--.

COLUMN 17

Line 42, "starts the data shared data" should read --starts the shared data--.

COLUMN 19

Line 38, "information a group" should read --information for a group--.

UNITED STATES PATENT AND TRADEMARK OFFICE
CERTIFICATE OF CORRECTION

PATENT NO.        : 7,218,663 B1
APPLICATION NO.   : 09/219747
DATED             : May 15, 2007
INVENTOR(S)       : Akane Yokota et al.

It is certified that error appears in the above-identified patent and that said Letters Patent is hereby corrected as shown below:

COLUMN 20

Line 30, "by said requesting" should read --in said requesting--.

Signed and Sealed this

Fifteenth Day of April, 2008

JON W. DUDAS
*Director of the United States Patent and Trademark Office*